(12) United States Patent
Navaratnam

(10) Patent No.: US 10,152,719 B2
(45) Date of Patent: *Dec. 11, 2018

(54) VIRTUAL PHOTOREALISTIC DIGITAL ACTOR SYSTEM FOR REMOTE SERVICE OF CUSTOMERS

(71) Applicant: Ratnakumar Navaratnam, Colombo (LK)

(72) Inventor: Ratnakumar Navaratnam, Colombo (LK)

(*) Notice: Subject to any disclaimer, the term of this patent is extended or adjusted under 35 U.S.C. 154(b) by 0 days.

This patent is subject to a terminal disclaimer.

(21) Appl. No.: 15/642,365

(22) Filed: Jul. 6, 2017

(65) Prior Publication Data

US 2017/0308905 A1 Oct. 26, 2017

Related U.S. Application Data

(63) Continuation of application No. 15/273,852, filed on Sep. 23, 2016, now Pat. No. 9,721,257, and a
(Continued)

(51) Int. Cl.
*H04N 7/15* (2006.01)
*G06Q 30/00* (2012.01)
(Continued)

(52) U.S. Cl.
CPC .......... *G06Q 30/016* (2013.01); *B25J 11/001* (2013.01); *B25J 11/0015* (2013.01);
(Continued)

(58) Field of Classification Search
None
See application file for complete search history.

(56) References Cited

U.S. PATENT DOCUMENTS

D314,401 S 2/1991 Lehman et al.
7,136,818 B1 11/2006 Consatto et al.
(Continued)

FOREIGN PATENT DOCUMENTS

JP 2004261941 A 9/2004
JP 2010213127 A 9/2010
WO 2005055602 A1 6/2005

OTHER PUBLICATIONS

Kumar R.K., Sunil and Lajish, V.L., Vowel Phoneme Recognition Based on Average Energy Information in the Zerocrossing Intervals and its Distribution Using ANN, Intl. Journal of Information Sciences and Techniques (IJIST), vol. 2, No. 6, Nov. 2012, pp. 33-42, Department of Computer Sciences, University of Caliut, Kerala—India.
(Continued)

*Primary Examiner* — Creighton Smith
(74) *Attorney, Agent, or Firm* — Thomas O'Rourke; Bodner & O'Rourke, LLP

(57) ABSTRACT

A system for remote servicing of customers includes an interactive display unit at the customer location providing two-way audio/visual communication with a remote service/sales agent, wherein communication inputted by the agent is delivered to customers via a virtual Digital Actor on the display. The system also provides for remote customer service using physical mannequins with interactive capability having two-way audio visual communication ability with the remote agent, wherein communication inputted by the remote service or sales agent is delivered to customers using the physical mannequin. A web solution integrates the virtual Digital Actor system into a business website. A smart phone solution provides the remote service to customers via an App. In another embodiment, the Digital Actor is instead displayed as a 3D hologram. The Digital Actor is also used (Continued)

in an e-learning solution, in a movie studio suite, and as a presenter on TV, online, or other broadcasting applications.

19 Claims, 17 Drawing Sheets

Related U.S. Application Data continuation of application No. 15/274,150, filed on Sep. 23, 2016, now Pat. No. 9,727,874, said application No. 15/273,852 is a continuation-in-part of application No. PCT/IB2014/060618, filed on Apr. 10, 2014, said application No. 15/274,150 is a continuation-in-part of application No. PCT/IB2014/060618, filed on Apr. 10, 2014.

(51) Int. Cl.
| | | |
|---|---|---|
| *B25J 11/00* | (2006.01) | |
| *H04M 3/51* | (2006.01) | |
| *B25J 13/00* | (2006.01) | |
| *G06Q 30/02* | (2012.01) | |
| *G10L 21/10* | (2013.01) | |
| *G10L 15/22* | (2006.01) | |
| *G06F 17/30* | (2006.01) | |
| *G06F 3/01* | (2006.01) | |
| *G10L 13/04* | (2013.01) | |
| *H04N 7/14* | (2006.01) | |
| *G10L 13/00* | (2006.01) | |
| *G10L 15/00* | (2013.01) | |
| *G10L 15/26* | (2006.01) | |
| *H04N 5/232* | (2006.01) | |
| *G10L 15/02* | (2006.01) | |

(52) U.S. Cl.
CPC .............. *B25J 13/00* (2013.01); *G06F 3/017* (2013.01); *G06F 17/30654* (2013.01); *G06Q 30/02* (2013.01); *G10L 13/043* (2013.01); *G10L 15/02* (2013.01); *G10L 15/22* (2013.01); *G10L 15/265* (2013.01); *G10L 21/10* (2013.01); *H04M 3/5125* (2013.01); *H04N 5/23203* (2013.01); *H04N 7/147* (2013.01); *H04N 7/157* (2013.01); *G06F 17/30259* (2013.01); *G06F 17/30766* (2013.01); *G06Q 30/0241* (2013.01); *G10L 13/00* (2013.01); *G10L 15/00* (2013.01); *G10L 15/26* (2013.01); *G10L 2015/025* (2013.01); *G10L 2021/105* (2013.01); *H04M 2203/1025* (2013.01); *H04N 5/23219* (2013.01)

(56) References Cited

U.S. PATENT DOCUMENTS

| | | |
|---|---|---|
| 8,165,282 B1 | 4/2012 | Coughlan et al. |
| 8,731,180 B2 | 5/2014 | Benefield et al. |
| 2006/0190344 A1 | 8/2006 | Sang et al. |
| 2007/0239317 A1* | 10/2007 | Bogolea ............... B60H 1/0065 700/276 |
| 2010/0073331 A1 | 3/2010 | Kord |
| 2011/0126119 A1* | 5/2011 | Young ..................... G06F 3/048 715/744 |
| 2011/0248992 A1 | 10/2011 | vaOs et al. |
| 2013/0006874 A1* | 1/2013 | Klemm .................. G06Q 30/02 705/304 |
| 2013/0057556 A1* | 3/2013 | Amento .................. G06T 13/40 345/474 |
| 2013/0191122 A1* | 7/2013 | Mason .............. G06F 17/30017 704/231 |
| 2013/0257876 A1 | 10/2013 | Davis |
| 2014/0035934 A1 | 2/2014 | Du et al. |
| 2014/0218371 A1 | 8/2014 | Du et al. |
| 2014/0361076 A1* | 12/2014 | Iantorno ............. G06F 19/3462 235/381 |
| 2016/0006987 A1 | 1/2016 | Li et al. |
| 2017/0177080 A1* | 6/2017 | Deleeuw ................ G06F 3/013 |

OTHER PUBLICATIONS

Cappelletta, Luca, and Harte, Naomi, Phoneme-to-Viseme Mapping for Visual Speech Recognition, Department of Electrical Engineering, Trinity College, Dublin, Ireland.
Robertson, Barbara, Big Moves, http://www.cgw.com/Publications/CGW/2006/Volume-29-Issue-11-Nov-2006-/Big-Moves.aspx.

\* cited by examiner

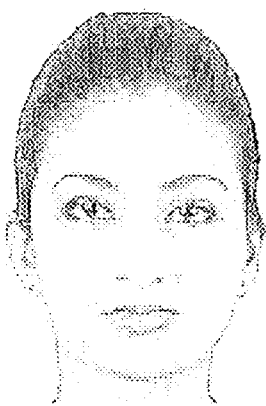
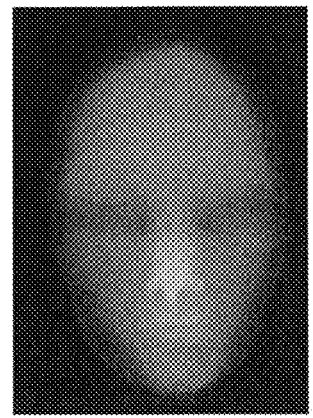
FIG. 9A          FIG. 9B
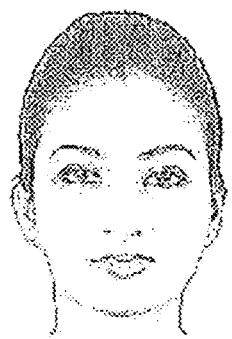
FIG. 10A     FIG. 10B     FIG. 10C
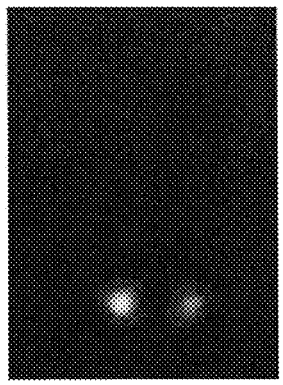
FIG. 11A          FIG. 11B

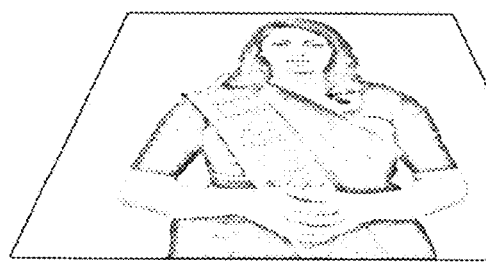 
FIG. 22A  FIG. 22B
FIG. 23

VIRTUAL PHOTOREALISTIC DIGITAL ACTOR SYSTEM FOR REMOTE SERVICE OF CUSTOMERS

CROSS-REFERENCE TO RELATED APPLICATIONS

This patent application is a continuation of U.S. patent application Ser. No. 15/274,150, filed on Sep. 23, 2016 and U.S. patent application Ser. No. 15/273,852, filed on Sep. 23, 2016, which are continuations-in-part of and claim the benefit of priority to International Application No. PCT/IB2014/060618, filed Apr. 10, 2014, which claims the benefit of priority to Sri Lankan Patent Application No. LK/P/1/17462, filed Mar. 28, 2014. U.S. patent application Ser. No. 15/274,150, filed on Sep. 23, 2016 and U.S. patent application Ser. No. 15/273,852, filed on Sep. 23, 2016 further claim the benefit of priority to Sri Lankan Patent Application No. LK/P/1/18676, filed on Mar. 18, 2016. The disclosures of each of the foregoing patent applications is incorporated by reference herein in its entirety for any purpose whatsoever.

BACKGROUND OF THE INVENTION

Field of the Invention

The present disclosure is directed to improved methods and systems for providing remote services to individuals or groups of customers using a Photorealistic Digital Actor system with real-time two-way collaborative communication.

Description of Related Art

Providing personal services, such as in sales applications, requires significant personal effort of salespeople. While passive displays (billboards and the like) can sometimes capture the attention of a potential customer, these methods are no substitute for interactive salespeople to describe products based on inputs received from the potential customer, resulting in the sale. The available digital display facilities can only provide information to the customer through different kinds of advertisements. Therefore, they cannot effectively interact with the customers. The salesperson should be in a position to effectively explain about their products and be able to answer the questions from the customers who seek further clarifications on such products. Further they should have a pleasant appearance in front of the customers and should be able to understand the needs of the customers. However, such actual salespeople are costly and are thus in limited supply. Also, a good interaction with the customer needs a significant amount of practice. Furthermore the "uniformity in service" that an employer seeks in the tasks that salespersons engage in, is at risk as each individual would be different in approaching and carrying out the duties attributed to such a salesperson. Salespersons should be able to move around the place to find out potential customers who may be interested in their subject so that effective customer engagements can be obtained for satisfactory results.

Web technology is used for marketing requirements just by using simple advertisements placed around the content of the website. Further, the available mobile phone advertising techniques are also limited through text advertisements or simple apps for customer interaction. These technologies are used less effectively compared to their recent advancements. There is a better chance of using these technologies in more effective ways for customer engagement requirements. The present disclosure provides solutions for these and other problems, as described herein.

SUMMARY OF INVENTION

The purpose and advantages of the present disclosure will be set forth in and become apparent from the description that follows. Additional advantages of the disclosed embodiments will be realized and attained by the methods and systems particularly pointed out in the written description hereof, as well as from the appended drawings.

To achieve these and other advantages in accordance with the purpose of the disclosure, as embodied herein, the disclosure includes various implementations of virtual Digital Actor based service providers, such as sales persons.

The present disclosure particularly relates to a two-way collaborative display that is capable of detecting an individual in close proximity resulting in the image or the Digital Actor on display becoming live and interactive to engage the individual, or aspects thereof. Specifically, the digital display can create a virtual human Digital Actor in front of the customer which can engage, talk and answer the customers' questions. A remote operator can provide the speech information via text or voice input in such a manner that the Digital Actor will automatically act according to the given information. Further any kind of previously specified movements/gestures can be given to the Digital Actor by the operator or by an artificial intelligent platform (AI) while talking and during the engagement with the customer or during idle state. The Digital Actor is created from photographs and short video recordings previously taken from a real presenter. The disclosed technology also ensures that while the Digital Actor is performing different movements, there will be no abrupt leaps between different scenes of the Digital Actor.

The Digital Actor technology with two way interactive communication is developed mainly for several mediums of communications but is not limited to these:
1. Digital display solutions,
2. Online web solutions,
3. Smartphone applications,
4. Mannequins both stationary and moving,
5. 3D Display solutions for both glass or glassless usage,
6. Hologram and 3D volumetric applications for both stationary and moving applications,
7. E-Learning and communication solutions,
8. Movie studio suite applications,
9. TV or online or other broadcasting applications,
10. Standalone Digital Actor Application User-Interface to build the Digital Actor speech presentation with gestures which can be used to generate videos of the Digital Actor,
11. Web Digital Actor Application User-Interface to build the Digital Actor speech presentation with gestures which can be used to generate videos of the Digital Actor, and
12. Digital Actor as a Virtual Presenter Digital displays and other such mediums such as web pages are generally not able to interact in any way with their observers. In the disclosed solution, we provide the ability to effectively interact with the customers by incorporating the virtual Digital Actor in such mediums. For example, the web solution involves the use of the real time talking Digital Actor inside the client website so that the customers can obtain information from the web Digital Actor using the Internet. The online web solution has two types of deployments. The Digital Actor is permanently configured on the web page of the client in one implementation. In another implementation, the web page of the client is accessed via an online server, wherein the server has the Digital Actor and is displayed as a separate cover over the client's web page. With this technique the web page of the client is not impacted in any manner.

Similarly, an illustrative smartphone solution provides interaction with the customer through their mobile phone application. The customers can engage with the Digital Actor in order to obtain specific information. This technology can be applicable in areas such as guiding tourists whereby the Digital Actor becomes a personal guide, translator and even a negotiator. The Digital Actor is able to function as a tour guide as well as a translator by providing them information about locations, routes and different places of interest in the country.

The mannequin solution uses a new projection technique such that it can project the Digital Actor image within a very short distance onto a screen having the shape of an actual person standing erect. The mannequin can be placed stationary at strategic points or can be made in such a manner as to give the mannequin mobility by moving around in search of customers in need of customer support services while effectively engaging with the customers.

In 3D based applications the interactive Digital Actor or the image can be displayed using an apparatus for displaying 3D hologram images in which the observer can enjoy the hologram images at any position. In screen or display based 3D application the Digital Actor or the interactive image can be based on glass or glassless 3D display solutions.

In some embodiments of the hologram application, a short throw vertical projection mounted horizontally on a reflective ceiling and the projected images are reflected vertically onto pyramid design transparent screen producing holographic images of the Digital Actor. In another aspect, the hologram is imposed onto a single tilted glass surface as a reflection of the image on the floor or the ceiling. In another aspect, the Digital Actor image is directly projected onto a relatively rough glass at an angle closer to vertical, so that an image of the Digital Actor will be created on the surface of the glass.

In some embodiments, a 3D image of the Digital Actor with full viewing parallax at all horizontal and vertical angles is created in a 3D volumetric display. The Digital Actor on the display can be viewed from any direction and they can walk behind to see the back side of the Digital Actor which can produce real experience of an actual person to the virtual Digital Actor. The 3D Digital Actor can be placed at a stationary location or can provide mobility so that it can move to different locations to attract customers.

The Digital Actor solution provides a human presenter a digital suite with interactive capabilities that allows to create engaging and effective human presenters that bring e-learning and communications projects to life. In one aspect, the Digital Actor can act as a virtual presenter to provide online tutorials in a website. In another aspect, the Digital Actor acts as an interviewer who can interview people and evaluate their performance. Such applications of the Digital Actor solution are illustrated in FIG. 6.

Digital Actor creation enables to generate different characters with multiple ethnic, gender, and age variations, to create realistic human actors with the full the auto lip sync, mouth shapes and movement technologies whereby characters can speak virtually any language. Digital Actor creation with a full suite of gestures library for each character and adding props to the background enables one to create a virtual movie studio to produce very cost effective movies, presentation videos etc. In the broadcasting industry the Digital Actor can be the newscasters, weathermen or women for all Medias including TV, news presenters, online and other digital media broadcasting.

In another solution, the Digital Actor application is provided as a standalone application with a suitable user interface to create the speech with the relevant gestures and facial emotions of the Digital Actor. User can create their own video to be integrated into their presentation or introductory video. The output video can be obtained by also adding further modifications such as replacing background, changing size, position and rotation of the Digital Actor, give animations and transitions etc.

The above solution can also be implemented in a web browser while the main Digital Actor application is run at the server. The web user-interface application can also provide all the above features.

Another solution is developed to use the Digital Actor solution as a real-time virtual presenter to perform live presentations in front of an audience. A PowerPoint or other sort of previously created presentation file is uploaded to the Digital Actor application, and the Digital Actor will start to perform the presentation which eliminates a need for real presenter to be present at the location. The presenter may be a different person or a virtual representation of the real presenter with his or her appearance and voice.

Other application includes the Digital Actor as a Virtual Presenter for slide presentations, tutorials, DIY and how to videos, infomercials and other applications.

Some implementations provide a combination of an electronic display (such as a digital signage monitor screen, or a special back or front high resolution projection screen) with a collaborative and interactive audio and video system, a virtual Digital Actor screen in a walking physical mannequin, a smart phone screen or a website interface. As one example, such a display in a shopping location (e.g., department store) can include an independent stand or wall mounted display unit that may also include full or portions of a physical mannequin. All these implementations use talking virtual Digital Actor systems and methods proposed in this disclosure. The Digital Actor movements and speech are preferably controlled by a remote operator or an AI. The interactive audio visual components can include, for example, a video camera, PIR sensor and microphone for capturing images and sounds of a potential customer in the store to identify the customers in front of the screen. A speaker for projecting sound, such as from a remote salesperson, a screen for displaying an image of the remote sales person or of a virtual Digital Actor of a remote sales person, and other sensors to detect and trigger the system into an interactive operable mode based on the presence and/or movement of an individual are utilized. It can also maintain and update a database of the customer traffic statistics around the display, these statistics can include, but are not limited to, the time a customer approached the display, residence time, whether or not the customer engaged, how long the customer engaged, whether a sale was completed, customer gender, perceived income bracket, ethnicity, perceived age group and most importantly the customers' perception and emotional reaction to the product on display. These data would be substantially valuable for marketing and targeting specific groups. In one implementation, the components can be integrated into a vending machine for relatively high cost items (e.g., electronics, beauty products, and the like).

In some embodiments, the display unit can be configured to display images or videos of one or several products on display or other images or videos to attract the interest of a customer. When a potential customer walks close to such a display unit, the sensor(s) detect the presence of an individual that may be a potential customer, and the system then establishes an audio and video call or other communication link to a central location where a trained salesperson is located, such as a centralized service center located remotely (e.g., overseas) or to a service desk within the premises. An image of the virtual Digital Actor or the actual salesperson can then be displayed on the screen to begin interacting with the potential customer. Preferably though, a virtual Digital Actor of the sales person is displayed. The Digital Actor is created using image sequences recorded previously such that no 2D or 3D animation techniques are used for creation of the Digital Actor. Only in the case of full 3D Digital Actor used for 3D volumetric holograms, the Digital Actor is either reconstructed from multiple photos/videos taken from different viewpoints or generated by 3D modeling and animation application. The voice is given to the Digital Actor in two ways which are by using text input and as direct voice input. In text implementation, the text typed by a remote operator is processed to produce speech and animations on the Digital Actor. The Digital Actor is made to resemble the remote sales person in a different manner, or the Digital Actor and the voice of the Digital Actor can be completely altered to look and sound like a different person, such as a celebrity or other well-known spokesperson. The digital display system can also include equipment such as barcode scanners to scan products and printers to print the bills or discount coupons such that the products can be instantly sold to the customer. In addition to this, consultation facilities can be provided to the customer. For example a remote Beauty Advisor can provide cosmetic analysis and advice through skin analyzer connected to the Digital Display.

As will be appreciated, the disclosed embodiments have a variety of applications. As one example alluded to above, the systems can be used to provide a virtual sales person promoting specific products within a department store, supermarket, drugstore or the like. Similarly, in the retail banking the Digital Actor can be made to enable true virtual banking at any unmanned or remote branch. In another embodiment, the mannequin system can be used to provide a service assistant, such as on a very large shop floor with numerous aisles, to assist customers to find the appropriate product within the shop floor and to assist with any other inquiries. In the mannequin implementation, the platform can be integrated onto a moving robot that is configured to move through the store or other location helping individuals present there, such as in stores, conventions, airports, and the like.

In some embodiments, the Digital Actor is a complete digital movie suite that allows you to create an engaging and effective human presenter that bring learning and communications projects to life, without engaging live human actors. By selecting from the unlimited combinations of movements and gestures one can create virtual combinations of movements and gestures of the presenter. With the auto lip-syncing proposed in the present disclosure, the presenter can talk, sing and move their arms, hands and their bodies, the possibilities are endless.

The web solution can be used as a real-time FAQ solution and as a facility of helping the customers within any kind of a website. The Digital Actor can be placed within a given window of space in the website such that the users can speak with the Digital Actor by using text messages, voice or as video calls. The operator can be a specialized person in the subjects related to the website or an Artificial Intelligence platform The smartphone implementation is a mobile application which contains all the necessary image and media files needed for basic operation of the virtual Digital Actor system. The online communication system between the mobile user and the operator is established via a server such that the communication can be done in real time. The main information conveyed between the user and the operator are speech audio and the information related to images that need to be pushed in the mobile application. The images related to each frame that need to be pushed in the mobile application are sent as symbols such that the mobile can select the relevant image from its memory. In this way, only a minimum level of data usage is utilized for the communication between the two.

In the real-time creation process of the Digital Actor, different problems can arise such as the jump cuts that can occur when one tries to combine different image sequences related to different movements of the Digital Actor. To overcome this issue a new technique based on image morphing is utilized to remove jump cuts between different scenes. The resulting Digital Actor solution can operate with no possibility of occurring jump cuts between different movements. The lip-sync of the Digital Actor is also controlled using a database of previously created transitions between visemes. In some implementations, the database contains 231 viseme transitions (all the possible transitions in one direction) created using the 21 viseme images of the presenter. The viseme transitions are created by morphing one viseme image to the other using software based method. The 21 viseme images are either created using an idle face image using software based technique or they are separately photographed from the real presenter. Further, any other required specific movements of the Digital Actor such as gestures can be given to the Digital Actor in real time. These specific movements are also recorded from the real presenter. Using these techniques, the lip-sync, hand movements and required specific gestures are given to the Digital Actor such that the operator can use them to express his ideas effectively to the user.

Differences with Existing Patents

In the U.S. Pat. No. 7,899,774 B2 Mar. 1, 2011, a networked interactive expert system is disclosed for selectively providing relevant expertise when a user requires such assistance. In this method a virtual Digital Actor based technology is not used to interact with the customer. Unlike the proposed solution, the technique in the above patent does not contain a virtual Digital Actor based method to interact with the customers. There is a remarkable distinction between our method and the method specified in the above mentioned patent as it relates to matching the customer's request based on the category from a list of expert studios providing expertise corresponding to the identified location associated with the customer's request. In that patent, the information content is stored either at the remote expert's station or kept at the remote shared content server and transmitted via the network to the Expert Station interacting with the customer. U.S. Pat. No. 7,899,774 B2 system facilitates an interactive session between customer and expert based on the particular expertise by mapping information associated to set of expert station, current location and type of expertise provided.

The proposed method in that patent comprises techniques to automatically control lip-sync and other movements of an Digital Actor generated by using previously recorded video sequences of a real person. Further our solution is not a traditional interactive videoconference session; the operator conveys commands to the Digital Actor through voice or text at the remote digital signage display. The Digital Actor can gesture and can interact better with the customer through eye movements, head movements, shoulder movements, hands and body movements. Also the Digital Actor's mouth movements and lips are synced according to the pronunciation of words thereby the customer is made to feel that he/she is engaging with a real person. In our solution depending on the advertisement playing at that given time, the call is directed selectively to the remote operator associated with that particular advertisement for that product. In our solution the content is placed locally within the digital display system interacting with the customer. The digital display system has built-in intelligence either to respond to the customer directly with the appropriate content or connect to the operator who can selectively instruct on what content should be displayed. Our solution primarily determines the pairing of the customer to the remote operator or an AI via an Digital Actor driven by the event of the customer actions: (i) what video was playing in the digital signage that the customer was looking at, (ii) what video did he/she select from the touch pad/keyboard. Further unlike the U.S. Pat. No. 7,899,774 B2, in our Digital Actor based Digital Signage solution, no additional server is especially deployed for operation of the system.

U.S. Pat. No. 7,136,818 B1 Nov. 14, 2006 describes a system that performs prosodic analysis to do the movements of a virtual agent such as head movements and facial expressions which are based on prosodic analysis. The method in this patent tries to understand the meaning of the text/speech to determine the movements of the virtual agent.

In this patent application, video recordings of a real world presenter are used for generating the Digital Actor. The movements are not necessarily need to be related to the meaning of the speech. Using body and hand movements is also a main difference in the proposed technique. Further in the proposed method, lip-sync and body movements of the Digital Actor are generated according to both the voice of a real speech and Text To Speech (TTS) data. In the proposed method the operator has the ability to give a specific set of movements to the Digital Actor. A new real-time speech to phoneme conversion algorithm is used to detect the phonemes and their durations from the real-time speech audio input voice. The real-time lip-sync of the Digital Actor is obtained using a previously created image database of viseme transitions instead of the 3D animation based method proposed in the above patent.

In the Japanese Patent JP2010213127 (A)-2010 Sep. 24, operator performs by operating a robot connected to the client terminal and outputting operator voices in accordance with a robot operation control command and voice input to the operator terminal. In the above patent the robot performs using previously programmed operations.

Our solution is completely different, as it is a mannequin and the image is created by projection of a human Digital Actor. The proposed method does not use robotic moving parts (such as robot hands) to represent the physical mannequin. All the actions are performed by the projected human image in the screen of the mannequin. The Digital Actor with face and body movements is controlled by Artificial Intelligence (AI) or manually selected and controlled by the remote operator. The voice is via Text To Speech or real time voice. The lip movements of the Digital Actor are determined through complex algorithms as described in this application.

In the Japanese Patent JP2004261941 (A), an image of an operator of the control device is displayed on a liquid crystal display screen, and a voice of the operator is produced through a speaker.

While ours is a mannequin and the image is created by projection of a virtual human Digital Actor. Here, the projected human image belongs to a real person recorded previously. The Digital Actor performs real-time lip-sync, face and body movements according to the voice. The specific movements are controlled by in built Artificial Intelligence (AI) or remote operator. The voice is generated via Text To Speech or real time voice. The auto lip sync, movements and mouth shapes of the Digital Actor are determined through complex algorithms as described in this application.

In United States Patent Application US 2013/0257877 A1, Systems and methods are provided for generating an avatar to represent traits of a human subject. First interactions of the human subject are observed, and characteristics of the human subject are extracted from the observed interactions. An avatar characteristic table is generated or updated based on the extracted personality characteristics. Second interactions of the human subject are observed, and the avatar characteristic table is updated based on the observed second interactions. Further, that disclosure relates generally to animated avatars designed to simulate personality characteristics for entertainment and other applications. US 2013/0257877 A1 Patent Application also focuses on using AI systems to control Avatar performance. In that patent application, a more realistic avatar experience has been proposed whereby a typical cartoon-like avatar or 3D modeling based avatar is animated to mimic the movements and motion of a user whose movements and motions are sensed by a camera/sensor system. It tends to use a base model avatar which may be cartoonish in character, while upgraded versions become more photorealistic and include more detailed modelling. US 2013/0257877A1, patent application uses behavioral characteristics and personal characteristics that distinguish the person as a unique individual (at a particular point in time, or particular points in time). In US 2013/0257877 A1 patent application, the wireframe avatar may speak words spoken by the live actor, whose voice is modified to sound like the human subject based on voice characteristics captured during avatar model building. In US 2013/0257877 A1 patent application, the communication channel is a local or Internet based voice, video, or text chat channel used for observing first and second interactions of human subject, generating avatar characteristics table etc. In US 2013/0257877 A1 patent application, an even more realistic avatar experience has been proposed, in concept, whereby 3D modeling and 2D video might be combined in real time computationally to create a very realistic avatar performance.

This is different from this embodiment since in this patent application interactions of human subjects are not observed to create the performance of the Digital Actor. Our solution focuses of using real world presenter captured using video cameras. This disclosure is focused on creating the Digital Actor more realistic in terms of appearance, behavior and speech. The proposed method in this patent does not do any sort of capturing to mimic the motion of the user or any form of 3D or detailed modelling of real person. Only image sequences generated by video recording of a real person is used which tends to be more realistic with less effort. Instead, only the text or speech input is used to generate movements of the Digital Actor. The solution presented herein uses direct video recordings of a real person and the images are modified in real time to reflect the behavior of the presenter (no capturing of characteristics such as personality capture questionnaires or physical appearance questionnaires is done). Buttons are provided for the remote customer service agent, which may be toggled to select a desired facial expression of the Digital Actor. Alternatively, gestures, hands, and body movements of the digital actor may be derived from the textual input of the remote customer service agent or the spoken words of the digital actor, based on a library of phrases, which may be indexed and matched to an appropriate gesture. For example, a portion of, or all of the phrase "I love the U.S.A." may be mapped to the hand gesture in which the digital actor's right palm is moved to touch the heart. In another example, for the phrase "I did not understand." the hands and palms of the digital actor may be moved to spread outwardly.

In this disclosure, speech is generated by TTS or by spoken voice of real presenter, which is then processed using proposed techniques to calculate and generate the related phonemes, visemes and their durations in real-time to be presented in the Digital Actor. In this patent, communication channel is mainly used to connect the customer with remote operator who is responsible for answering the customer questions, pushing advertisements etc. The disclosed method in this patent, only 2D video recordings are directly used for generating the Digital Actor, instead of combining 3D modeling and 2D videos.

It is to be understood that both the foregoing general description and the following detailed description are exemplary and are intended to provide further explanation of the embodiments disclosed herein. The accompanying drawings, which are incorporated in and constitute part of this specification, are included to illustrate and provide a further understanding of the method and system of the disclosure. Together with the description, the drawings serve to explain the principles of the disclosed embodiments.

BRIEF DESCRIPTION OF THE DRAWINGS

Accompanying the description drawings illustrating the disclosed embodiments, which represent non-limiting, examples and in which:

FIG. 9A is a pictorial representation of an original idle face image.

FIG. 9B is a depth map representation of the face image in FIG. 9A.

FIG. 10A is an illustration of an original face idle image.

FIG. 10B is the idle face image of FIG. 10A shown rotated with black dots.

FIG. 10C is the rotated image of FIG. 10B shown after filtering out the black dots.

FIG. 11A is an illustration of an original face image.

FIG. 11B is a map image of the face image of FIG. 11A shown with the two corner points of the mouth highlighted with white marks.

FIG. 22A is a pictorial representation of a properly distorted image that may be used for projection onto the mannequin screen.

FIG. 22B is the distorted image of FIG. 22A after being projected onto the mannequin screen, to appear undistorted thereon.

FIG. 23 is a pictorial representation of the final background removed and distorted image used for projection to the mannequin screen.

DETAILED DESCRIPTION OF THE INVENTION

Figure 1:
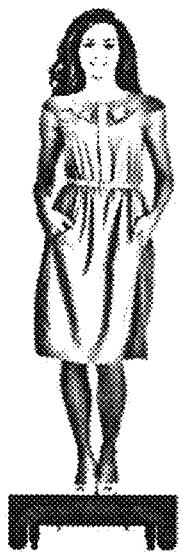
FIG. 1 is a view of an illustrative physical mannequin in accordance with the disclosure.

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Also, all references (e.g., patents, published patent applications, and non-patent literature) that are cited within this documents are incorporated herein in their entirety by reference.

Furthermore, the described features, advantages, and characteristics of any particular embodiment disclosed herein, may be combined in any suitable manner with any of the other embodiments disclosed herein.

Reference will now be made in detail to the present preferred embodiments of the disclosure, examples of which are illustrated in the accompanying drawings. The method and corresponding steps of the disclosed embodiments will be described in conjunction with the detailed description of the system.

Digital signage is becoming a consumer engagement technology. Interactive touch systems help customers educate themselves about products and services. Specifically, these engagement techniques do not allow a seller to directly engage with the potential purchaser to complete the sale. In a conventional sales counter, the sales person behind the counter promotes the product and closes the sale. All the other displays such as posters, mannequins and the like are passive and generally inactive inanimate objects for providing promotional information to potential purchasers. These displays are generally not able to interact in any way with their observers. For example, the conventional video advertisements are not sensitive to the user's response.

A major barrier in interactive touch screen systems is that they are impersonal and time consuming to use without assistance. The general public does not have a clear understanding about how to operate a touch screen system established at a particular shop/store. They must be informed and explained how they have to proceed with the facilities and features available in the system. This is a profound issue among older demographics that did not grow up with such technologies. This is particularly inconvenient when this very demographic is a target demographic for which a promoted product is intended. Further, in a super-market/large store environment, people take a lot of time to find the products that they need. They have to walk around and go through all the racks before they finally end up with the product they need to purchase. Therefore, a human mannequin controlled automatically or by a remote operator can be helpful to guide the customers that come to the store so that they can find out their requirements easily. The operator can have a large number of databases containing information and details of different products sold at the store. This helps to save a lot of wage costs needed for large numbers of workers and will need only a limited practice for an operator to do so.

The present disclosure provides various embodiments that address these and other problems. Embodiments of the invention are typically divided into 12 categories. They are namely the digital display solution, walking or stationary mannequin, online web solution, smart phone solution, 3D Display solutions for glass or glassless usage and hologram plus e-learning and other interactive communication solutions. All these solutions use the same technology to generate the visual representation of the Digital Actor. Therefore, the basic structure and the techniques used for implementation of the talking Digital Actor with facial and body expressions is the same for all these twelve embodiments (unless for very few changes) and is described in this section. For the case of 3D Digital Actor, a 3D reconstruction is obtained using the generated 2D Digital Actor in the same method and many other images/videos recorded from different other viewpoints such as right side, left side, back side etc. This method provides a 3D version of the same Digital Actor we create for 2D Digital Actor applications.

Using an interactive display unit, when a potential customer walks close to the display unit, sensors (such as vision sensors, infrared or ultrasonic motion detectors or a pressure mat on the floor near the display) can detect the presence of the potential customer and establish a video call to a service center in a remote location located on the premises or in an entirely different location. The Digital Actor system can start the operation by appearing on the screen once a person has stepped towards the screen and can perform an automatic greeting to the customer. A trained sales person in the remote location can then start speaking and engage directly with the customer. The trained sales person can be displayed on a screen of the display unit either in real appearance or as a Digital Actor of a virtual sales person. The lips of the virtual Digital Actor open, close and move in substantial synchronization according to the text to speech input given by the operator or voice of the trained sales person that will be speaking through speakers in the display unit. If desired, other facial and body movements of the Digital Actor can be programmed to mimic emotions (happy, sad, frustrated, incredulous, etc.). The facial expressions can be expressed, for example, in response to the intonation of the trained sales person's voice/text input or in response to manual input of the trained sales person. The body and hand movements of the Digital Actor are also expressed depending on the speech or text input such that there will be hand movements when the Digital Actor is talking. Further, specifically recorded hand movement sequences can also be pushed to the virtual Digital Actor without letting any sort of jump cut to occur. This process can provide video realistic Digital Actor motion including real time lip-sync so that the final output will look like an actual person talking in the digital screen. In some implementations, the remotely located sales person can be monitoring the counter through the video camera and activate a conversation as soon as a potential customer comes near the display unit. The display unit can also be provided as a booth at an exhibition or seminar, shopping malls and arcades, information counters at airports, ATM machines and other locations, front desks at hotels during off-hours, and the like.

Visual Presentation of the Digital Actor with Lip-Sync and Body Movements

Figure 7:
FIG. 7 shows the different separate parts of the Digital Actor used to simulate real-time speech.

In the available literature, lots of work has recently been focused on generating visual Text-to-Speech interactions between a human user and a computer device. The natural interaction between a human and a computer is increasing as the quality of the virtual agents improves. But the widespread acceptance and use of virtual agents is obstructed by unnatural interactions with the users. Recent studies show that a customer's impression of a company's quality is heavily influenced by the customer's experience with the company. When a virtual agent is not pleasing to interact with, a customer will have a negative impression of the company represented by the virtual agent. In some instances, a virtual agent head appears to float over a background. Some of the recently developed methods try to get the meaning of the text or voice input to determine the movements and the facial expressions of the Digital Actor. These techniques are highly complicated to implement and fail to produce desirable results pertaining to customer satisfaction. Yet, such an approach is usually not feasible, since natural language understanding is very unreliable. A wrong interpretation can do considerable harm to the virtual agent representation. The methods of manually adding all the movements to the virtual agent are slow and cumbersome. Further, quicker systems do not provide a realistic visual movement that is acceptable to the user. The traditional methods of controlling virtual agent movement preclude the opportunity of engaging in a realistic interaction between a user and a virtual agent. Most of the available techniques tend to use 3D animated entities for creating the illusion of a real person. Nevertheless these techniques are costly and cumbersome due to the difficulty of getting a realistic appearance of a person. Therefore, in this embodiment, a new approach is used to implement lip-sync and body/hand movements of the Digital Actor with respect to given text/voice input from the operator. In the proposed method, databases of video/image sequences recorded from a real human presenter are used to generate the visual representation of the talking Digital Actor. This technique can produce video realistic Digital Actor with real-time lip sync and body/hand movements as opposed to 3D animation based techniques. Since we use image sequences of a real person, the movements and expressions of the Digital Actor look more realistic and natural compared to other techniques. In the proposed technique, the recorded sequences are used to create physical movements of the Digital Actor by combining three different parts. They are the complete body with hand movements, face region and eyes as depicted in FIG. 7. All these parts are separately controlled to get the complete behavior and appearance of the complete Digital Actor.

Figure 8:
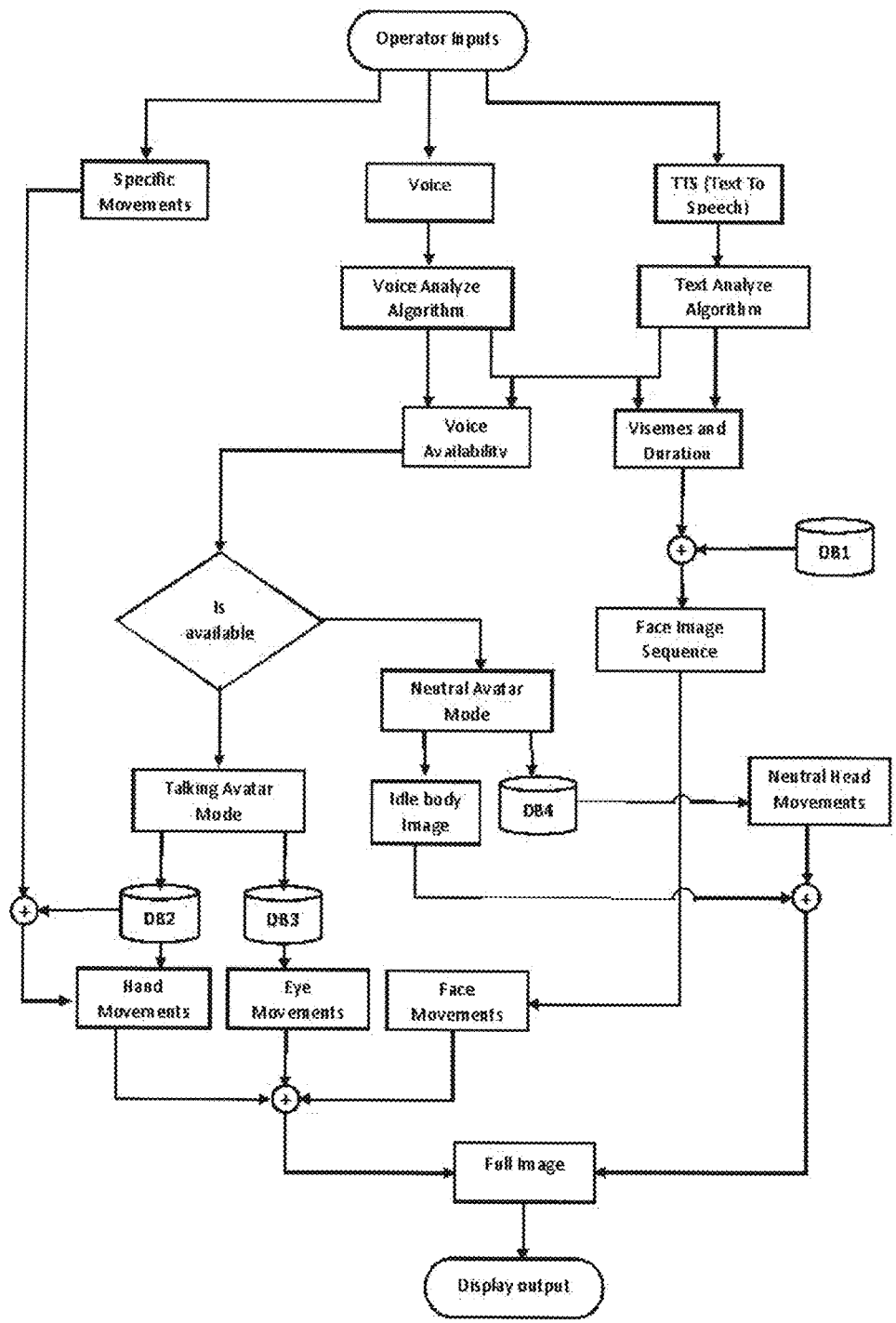
FIG. 8 is a basic block diagram that depicts the process of generating the speaking virtual Digital Actor.

The basic block diagram of generating the virtual Digital Actor movements based on the inputs of the operator is illustrated in FIG. 8. DB1, DB2, DB3 and DB4 in FIG. 8 respectively represents, face transition image database, hand movement image database, eye movement image database and DB4-random head movement image database. These image databases are used to keep the images that are needed to create different parts and different movements of the talking Digital Actor. As seen by FIG. 8, the inputs given by the operator can be voice/TTS for speech and commands for different specific movements required to be performed by the Digital Actor.

In case of text inputs, the text is converted to speech by using a text to speech module which also can produce underlying visemes and their durations in real-time, sync with the voice. If the input is real-time voice, a new real-time speech phoneme recognition system is proposed in this disclosure that can be used to determine the phonemes and their durations in real time speech. These phonemes are then mapped to their corresponding visemes and durations using a correct mapping criterion. The proposed phoneme recognition technique is discussed later in this section. The information about current viseme, next viseme and the duration of the transition obtained from this method are used to get the image sequences of the Digital Actor face from a database of image sequences with all the possible face viseme transitions in one direction. The database consists of image sequences for 231 viseme transitions corresponding to 22 visemes. Depending on the viseme transition we obtain from the TTS or speech recognition engine, the correct image sequence is loaded from the database and played in correct direction (forward or backward) at the correct speed which gives the relevant viseme duration. In this way, each viseme transition is played one after the other so that a continuous speaking Digital Actor face which is synchronized with the voice is obtained.

Further, the TTS and speech recognition engines are used to determine the starting and ending points of the speech. This information is used to control the hand movements and the head movements of the Digital Actor. Also, when the Digital Actor is not speaking, a previously created head movement loop is played to get the head movements of the Digital Actor. The hands are kept in an idle position during this time by displaying a still image of the complete body of the Digital Actor. As the Digital Actor starts to speak, the hands are taken from the idle position to the resting position using the 'hands moving up' image sequence from the database. Also, the head is moved from the moving position to the 'head looking forward' position using an image morphing based technique that will be discussed later. After the hands come to the resting position, an image sequence depicting the hand movements while the Digital Actor is talking, starts to play. This sequence starts from the hand resting position, and the latter half of the sequence is reversed to get a continuous talk loop such that it can be looped until the person stops talking. Since this loop starts from the resting position of the Digital Actor, there will be no jump cut when moving from 'hands moving up' sequence to the 'Digital Actor talking loop' image sequence. When the person stops talking, first the hands are morphed towards the resting position and a sequence depicting hands moving from the resting position to the idle position is played. The block diagram for performing this process is shown in FIG. 13.

Figure 13:
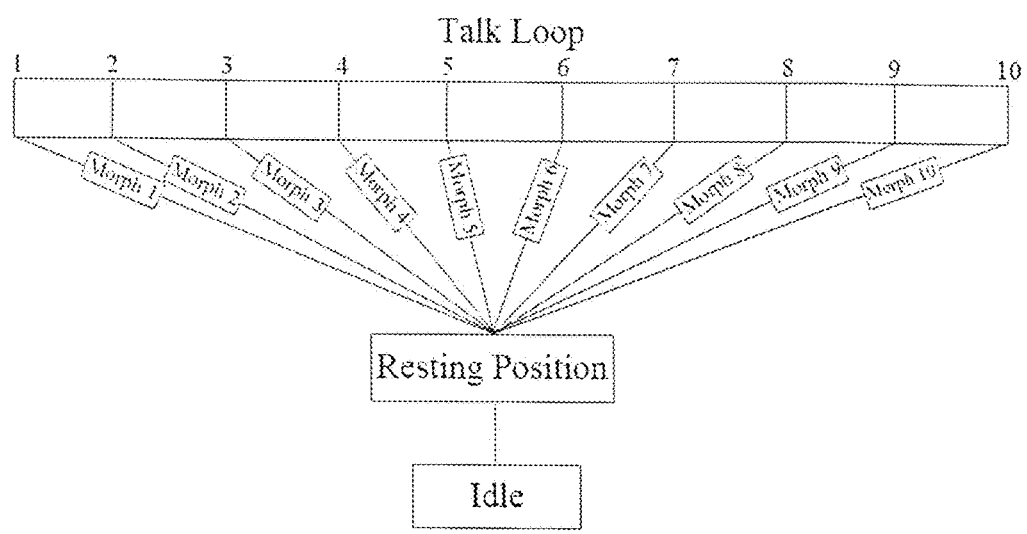
FIG. 13 is a basic block diagram that depicts the process of performing the hand movements of the virtual Digital Actor.

As depicted in FIG. 13, the talk loop is divided into a number (can be divided into any number of parts depending on the requirement) of equal parts (can use unequal parts also). The Digital Actor begins at the idle position. Until the operator starts to speak, the Digital Actor remains at this position while the Digital Actor's head is moved based on previously created image database for neutral head movements (head movement loop). Once the operator starts to talk, the hands (body images) move from the idle position to the resting position using the 'hands moving up' image sequence from the image database. Then the talk loop starts to play after playing the relevant morph transition depending on the position of the talk loop that we start to play. For the beginning of the talk loop (at position 1) there is no need of a morph transition since that starting frame of the talk loop is set to be the same as the resting position. The talk loop will continue until the Digital Actor stops speaking. Once the talking is stopped, first the talk loop is played up to the next immediate position of the talk loop out of the positions 1 to 10 in FIG. 13. For example if the speech is stopped at a position in between 3 and 4 positions, the talk loop is played up to position 4. After that, the relevant morph transition is played in the reversed direction such that the hands are moved to the resting position. Finally, a 'hands moving down' sequence is played to move the hand from the resting position to the idle position. When the talking is started again, the hands are again moved to the resting position and the relevant morph transition is played depending on where we start on the talk loop (for this, the immediate next position to where we stopped earlier or a random position of the talk loop can be utilized). This process is continued to obtain a smooth hand movement sequence without any jump cuts or discontinuities in the final Digital Actor output. Here, it can be noted that the morph transitions for 1 to 5 will be same as the transitions from 10 to 6 respectively because the talk loop latter half is the reverse of the first part of the loop. Still, this method can also be done without using a reversed half for the talk loop. It is done by making the last frame of the talk loop equal to the first frame of the video (to make the video loop without any discontinuity) by applying the morphing technique to the last part of the video. But it will require more morph transitions to be created.

Figure 14:
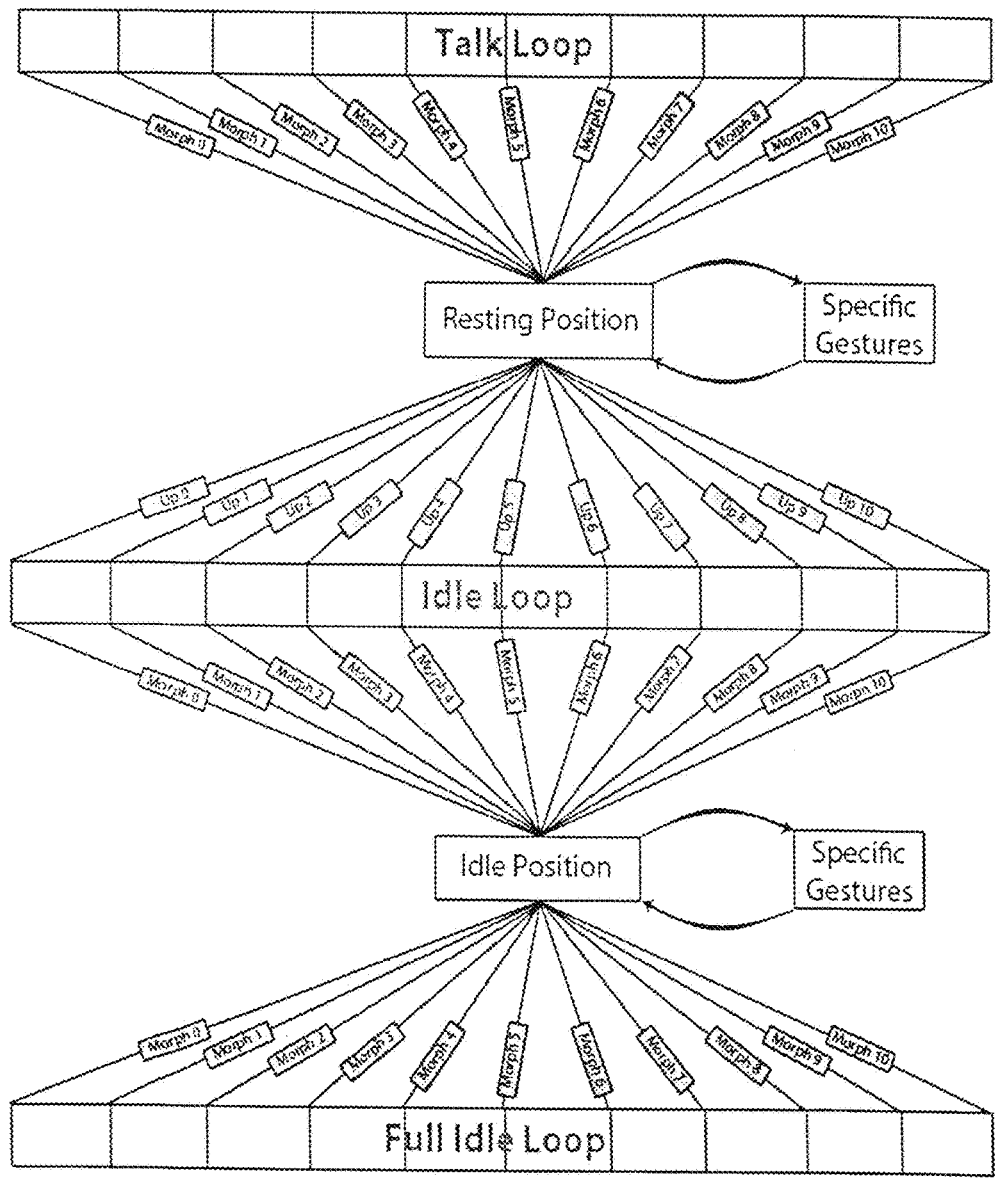
FIG. 14 is a pictorial representation of the block diagram for performing hand movements in an improved way by adding an Idle State Loop and a Full-Idle State Loop.

The body movements of the Digital Actor are further improved by using an Idle Loop instead of Idle image, and adding a Full Idle Loop as shown by FIG. 14. In this case, when the Digital Actor is at Idle State, an image sequence loop with slight movements with hands at the idle position (slight movements in the fingers, breathing etc.) is played.

Then morph transitions are used to take the Digital Actor to the Resting Position and then to the Talk Loop when the Digital Actor needs to talk. If the Digital Actor is kept at Idle State for a long time, the Digital Actor is sent to Full-Idle State via morph transitions as in FIG. 14. This Full-Idle State consists of full body image with larger movements of the presents such as looking around, shoulder movements etc. Therefore, during this state the head image and eye image is kept hidden. In case of any type of action such as speech or a specific gesture, the Digital Actor is directly taken to the resting position from the full idle state using above morphing techniques before doing the given action. After the action has been completed, the Digital Actor will come back to the Idle State. Finally, similar to specific gestures that starts and ends from resting position, another set of specific gestures can be used which starts and ends at idle position. These gestures can be used directly from the Idle State without having to go to the Resting State.

Digital Actor head movements are also controlled in the same way such that a head movement loop is played while the operator is silent, and morphing the head to the forward position when the operator starts to speak. The TTS/real voice is delayed until the head moves to the forward position so that the viseme transitions can be played sequentially after that in sync with the voice. The eye movements are manually given to the Digital Actor when the Digital Actor talks by replacing the eye region as depicted in FIG. 7. The reason for this is the inability to simultaneously depict motions of both the mouth (face visemes) and the eyes together by using a previously created database (as this requires extremely large size database to do all the possible movements). As a further improvement, instead of neutral head movements, neutral movements for entire body can also be utilized and use the same techniques to take the body and hands to the idle position/resting position when the speech inputs are obtained. This helps to give natural motion to the Digital Actor while it is at the idle state. Finally, any specific movement (such as greeting, pointing one hand to something) that starts and ends at resting position can be given to the Digital Actor based on the operators command or by AI. When the operator/AI gives the command for a specific movement, the hand is taken to the resting position using the discussed techniques, and the image sequence for the specified movement is played. After that, the hands can come down to idle position or to the talk loop depending on whether the person is talking or not. In this way, any previously specified movement can be given to the Digital Actor independent of whether the Digital Actor is talking or not.

Taking all these factors into consideration, ultimately all that needs to construct the talking Digital Actor is only one video sequence (need more only in case of 3D Digital Actor reconstruction). The video sequence should depict the presenter starting to talk with the hands starting from the idle position and keep on talking while the hands are slightly moved according to the speech. Further the required specific movements can be recorded such that the hands start and end at their resting position. These sequences are later edited to start and end from the exact frame of the resting position by using morphing technique. During the entire recording process the presenter should maintain the neck region at a stationary position so that further software based stabilizing can be done more easily. Using such a video sequence, the idle hand position image, hands moving up/down, and the relevant morph transitions for the body can be created. Further the eye movements, neutral head movements, head morph transitions to the idle position, face visemes and viseme transitions are generated using software based approaches. All the images that need to be pushed are created and stored in the database so that no real time image processing technique is utilized for the process.

Figures 12A, 12B:
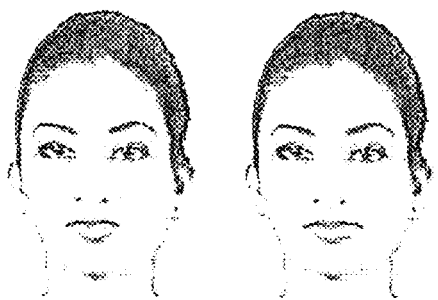
FIG. 12A is an illustration of an original rotated image without a smile.
FIG. 12B is the rotated image of FIG. 12A shown with a smile added using the mouth map image in FIG. 11B.

Head motion and facial emotions of the Digital Actor is further improved by providing dynamic real-time head movements to the Digital Actor (instead of previously recorded movements). This is achieved by using a depth map of the idle face image of the Digital Actor. This face depth image has same resolution as the idle face image and different colors for the pixels related to different depths in the face. Sample idle face image and the depth map image is shown in FIG. 9. When we need to rotate the Digital Actor face in one direction, each pixel of the face image is linearly moved in that direction in an amount directly proportional to the value of the relevant depth map pixel so that final image will look as if the Digital Actor head is physically rotated in that direction. But the final rotated image may have black dots at several places. Therefore, the final image is filtered to get an image without any black dots. The filtering is done by checking pixels with absolute zero and replacing those pixels with one of the eight (can use more neighboring pixels if needed) neighboring pixels which are not absolutely zero. Original image, rotated image and the filtered image is shown in FIG. 10. Further, face emotions are given to the Digital Actor by using another set of face maps that shows regions that are need to be affected more to reflect the emotion in the Digital Actor face. For example, a mouth map which indicates the two corner points is used to move only those regions of the mouth in different directions (amount proportional to the pixel value of the mouth map image) to get different emotions to the mouth such as flat smile, upward smile, sad mouth etc. In such cases, these map images are also rotated together with the face image so that they will keep tracking and following the relevant regions in the face. A mouth map image is shown in FIG. 11. A face with generated smile is shown in FIG. 12.

The databases for specific movements can be indexed for a particular movement, gesture or a series of gestures. The remote operator can select the relevant gestures appropriate to the content of text or speech at that time. If the operator is pushing a FAQ, the content can have particular gesture programmed or series of predetermined gestures programmed for the Digital Actor to play at the remote location while content the FAQ is being spoken by the Digital Actor. Further, a new method of programming the Digital Actor speech, gestures and face emotions are used. Hand gestures and facial emotions can be either given to the Digital Actor by pressing relevant buttons or as direct text input. The speech that needs to be given to be spoken by the Digital Actor is given the programmability where the required gestures/emotions can be given with the text where necessary with the relevant parameters such as speed, gesture number, direction of the gesture etc.

In a solution cited earlier in this document, the Digital Actor as a real-time virtual presenter to perform live PowerPoint or other previously created presentations eliminating the need for a real presenter was proposed. In this embodiment one can upload a Microsoft PowerPoint presentation to the solution and make the Digital Actor to speak the Notes embedded in the slides with applicable gestures while displaying the appropriate slide. The required gestures and timings can be set within the text in the Notes. The relevant parameters such as the chosen gesture, speed of the gesture movement, timing for the commencement for words to be spoken, and total time for the slide to appear on screen etc. can be easily specified.

For example, in order for a Digital Actor to present a simple slide narrating "My [a, b] (x, y) name is Lisa" where 'a', 'b' 'x' and 'y' are the parameters to be specified. After speaking "My" she will play the gesture 'a' at a speed of 'b' and she will speak the word 'name' after the delay of 'x' (milliseconds) and 'y' is the total time slide will appear on screen in seconds.

Phoneme Recognition Process

The proposed phoneme recognition technique is used to identify the phonemes from the speech acoustic signal in real time. Before identifying the phonemes in the speech signal, first the real-time speech signal is segmented into small segments in which each part represents only one phoneme. The phoneme segmentation is done by determining phoneme boundaries based on a signal energy based approach. In this method, the signal is divided into relatively large portions (i.e. about 0.7 seconds). Then this portion is segmented to smaller segments (much smaller than the minimum length of a phoneme, such as 20 ms) to get the average energy distribution of the considered audio signal portion. Then, the derivative of this distribution is obtained. Generally, the average signal energy remains almost constant for a given phoneme and rapidly changes to a different energy level for a new phoneme. This provides a sharp energy transition at the boundaries of the phonemes. Therefore, the peak points of the energy derivative function approximately provide the boundaries of the phonemes. Out of the peak points obtained from the energy derivative distribution, a number of peaks are selected as the phoneme boundaries based on the average speaking rate. These peak points are taken as the boundaries of the phonemes in the considered signal portion. Using this technique, the audio signal can be segmented to the phonemes contained in it. Also, the duration of each phoneme segment is found out using the sampling rate of the speech signal.

After segmenting the speech stream into individual phonemes, the next step is to identify each of these phonemes. Three comparison methods are disclosed for comparing each phoneme segment with a database of recordings of the 44 different phonemes. The database of recorded phonemes consists of phonemes recorded at plurality of different speed levels (for example slow, normal, and fast) and for different speakers to improve the accuracy (such as male and female voices). The three comparison methods used to compare the phonemes involve time domain correlation, frequency domain correlation and formant frequency ratios. In the first two methods, the correlation between the phoneme segment and set of phonemes in the database with close enough lengths to the segment (selected using a suitable threshold for the length difference) is obtained in time and frequency domain respectively. The phoneme in the database with the largest absolute value for correlation peak is considered as the correct phoneme for each case separately. In the third method, the formant frequency ratio $f_2/f_1$ (can use other ratios such as $f_3/f_1$, $f_4/f_1$ etc. as well) is compared with the phonemes in the database with the closest lengths to each other to determine the best matching phonemes. The phoneme with the closest value with the phoneme segment for this ratio is considered as the correct answer for that method. Ratios between two formant frequencies are used to make the measure independent of the voice of the speaker.

Other than these three methods, another feature extraction method is also utilized for the task of recognizing the phonemes. In this method, a database of average values for $f_3/f_1$ and $f_2/f_1$ (can use other ratios such as $f_3/f_1$, $f_4/f_1$ etc. as well) are calculated using a large number of phoneme samples. These two values for each phoneme segment are obtained. Then the Euclidean distances in 2D coordinate (can use 3D or higher if more ratios are utilized) plane from this point to each average point related to all 44 phonemes are found. The one with the minimum distance is considered as the correct phoneme for this method.

Finally, a probability based method is used to determine the correct phoneme using the answers obtained for four methods (or any number of phoneme recognition methods used) for each phoneme segment. This is done by selecting one which has the largest probability to be the correct phoneme, out of 44 phonemes (or out of 4 phonemes obtained for 4 methods) used for identification, given the obtained four answers. The correct phoneme Â is obtained as follows.

$$\hat{A} = \max_i [P(A_i | O_1, O_2, O_3, O_4)]$$

where $A_i$ is the $i^{th}$ phoneme, $O_1$, $O_2$, $O_3$ and $O_4$ are the outputs from the time domain correlation, frequency domain correlation, formant ratio comparison and formant frequency Euclidean distance method respectively. The probability values are obtained using a probability table generated using prior training process. Let the observations of the four phoneme detection methods be $O_{j,1}$, $O_{k,2}$, $O_{l,3}$ and $O_{m,4}$ respectively, where $O_j$, $O_k$, $O_l$ or $O_m$ can be observations for one of 44 phonemes used for recognition. Then the conditional probability for occurrence of $i^{th}$ phoneme $A_i$ can be expressed as, $$P(A_i | O_{j,1}, O_{k,2}, O_{l,3}, O_{m,4}) = \frac{A}{A+B} \text{ where}$$

$$A = P(A_i | O_{j,1}) P(A_i | O_{k,2}) P(A_i | O_{l,1}) P(A_i | O_{m,1}) P(A_i)^4 \text{ and}$$

$$B = P(\neg A_i | O_{j,1}) P(\neg A_i | O_{k,2}) P(\neg A_i | O_{l,1}) P(\neg A_i | O_{m,1}) P(\neg A_i)^4$$

and $\neg A_i$ denotes that the event $A_i$ does not occur. The one with the highest probability is selected using this method. The probabilities needed for the above calculations are obtained using a previously trained table. The phonemes and the durations obtained using these algorithms are then mapped to their corresponding visemes using a suitable mapping criterion.

This phoneme recognition technique operates by identifying the phonemes in the speech of the remote service agent from the database of recorded phonemes. Accordingly, the data base of recorded phonemes needs to be populated, which may be achieved by first providing a large audio sample of speeches that may be analyzed by an algorithm of the present invention. This algorithm will subdivide each audio sample into phonemes segments, then one may listen to each phoneme segment and may manually input the correct phoneme name into the algorithm. Then the algorithm will update tables in the data base.

Once the correct phoneme name has been inputted after listening to each phoneme, the data is maintained in two tables. The first table stores the number of times each phoneme is entered into the algorithm. The second table stores the number of times a transition from phoneme 'a' to phoneme 'b' occurred (i.e., it counts the number of times each transition occurs in the audio sample(s)). This second table also contains rows for all the possible phoneme transitions from one phoneme to another.

The performance of the phoneme recognition algorithm improves in accordance with the extent to which the data base has been populated. Since this a probability based technique, the larger the sample or number of samples used to populate the data base, the higher is the chance of obtaining the a value closer to the actual probability, which will result in more accurate selection of phonemes.

For each phoneme there is a corresponding viseme that can represent the mouth shape for that phoneme. Several phonemes may have the same viseme. A third table is provided that maps the correct viseme to each phoneme, so that the algorithm can get the viseme number related to the identified phoneme. This is used for the correct mapping of the phonemes to visemes. A standard phoneme to viseme mapping system may be used, such as, for example, the Microsoft TTS engine known as SAPI.

Basic Communication System Setup

In many implementations, there are two computing systems involved. One can be located at the remote location where the sale agent is active and the other can be located where the mannequin/display unit is located at the customer end. Both computers are capable of interacting with each other once the connectivity between the two computers is established. The system at the remote location can provide the following three options (among others). All portions of the system can be provided with noise cancelling sensitive microphones. Further any other software/hardware based noise cancellation techniques can be utilized to remove noise. The microphone at the remote agent's location can be provided with a mute option. The mannequin or display unit at the customer end can be provided with a concealed loud speaker system and video camera.

The display unit can use passive infrared or ultrasonic detectors that are operably coupled to the computer system at the customer end for detecting the presence of a potential customer when the potential customer is within a pre-set perimeter of the display (e.g., 0.5 meter, 1 meter, 1.5 meter, 2.0 meters, etc.) If the customer is within the perimeter zone for a conversation with the display or the mannequin, the system establishes a connection to the remote sales agent via an appropriate network (LAN, Wi-Fi, 3G or 4G). A video call is established to the remote sales agent. The sales agent answers the call. However as long as the microphone is muted at the sales agent location, there will be no changes to the facial appearance of the displayed face at the customer end. It still appears as an inanimate display. However the sales agent will be able to view the customer, and determine whether the customer appears worth engaging. If the sales agent decides to engage with the customer, they can unmute their microphone and start speaking. The display can be configured to become "live" and interactive in response to the sales agent switching off the mute feature and/or in response to the sales agent speaking. The facial expression of the Digital Actor on the display can then change and the lips can move in sync with the voice. Further, the body and hands of the Digital Actor can start to move in response to the sales agent's voice and other commands.

The trained sales agent can then graciously engage in a conversation with the customer. The sales agent can courteously promote the product and if the customer is keen, the remote sales agent can discreetly summon (via SMS/or other solutions) a local sales person or manager to the exact location of the customer to finalize the sale. In case of the digital display system with barcode scanner facility, the sales agent can guide the customer to scan the product and hand over the printed coupon to the cashier so that the relevant payment can be done to finalize the sale.

Figure 15:
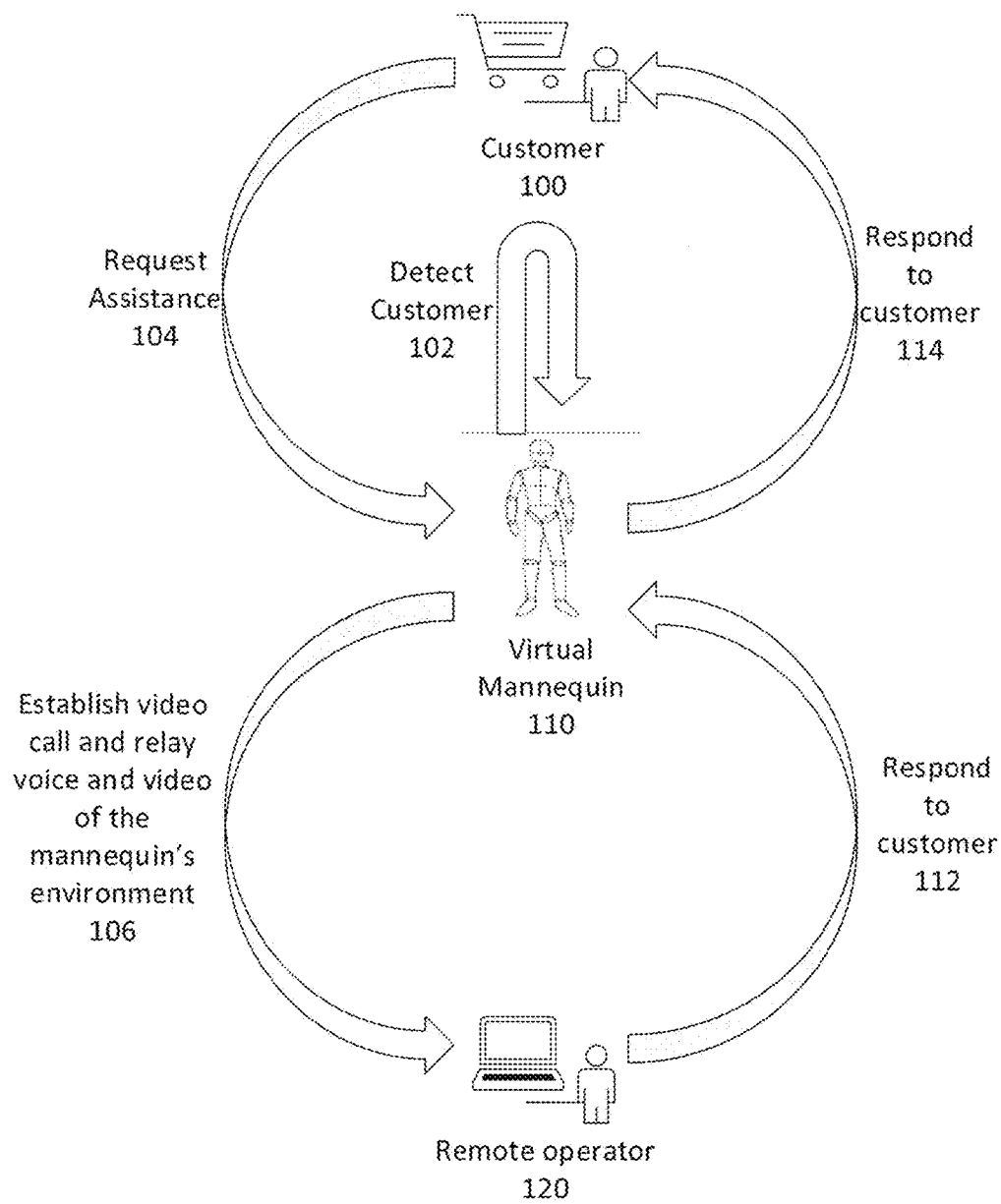
FIG. 15 is a high level data flow and process diagram in accordance with the disclosure.
Figure 16:
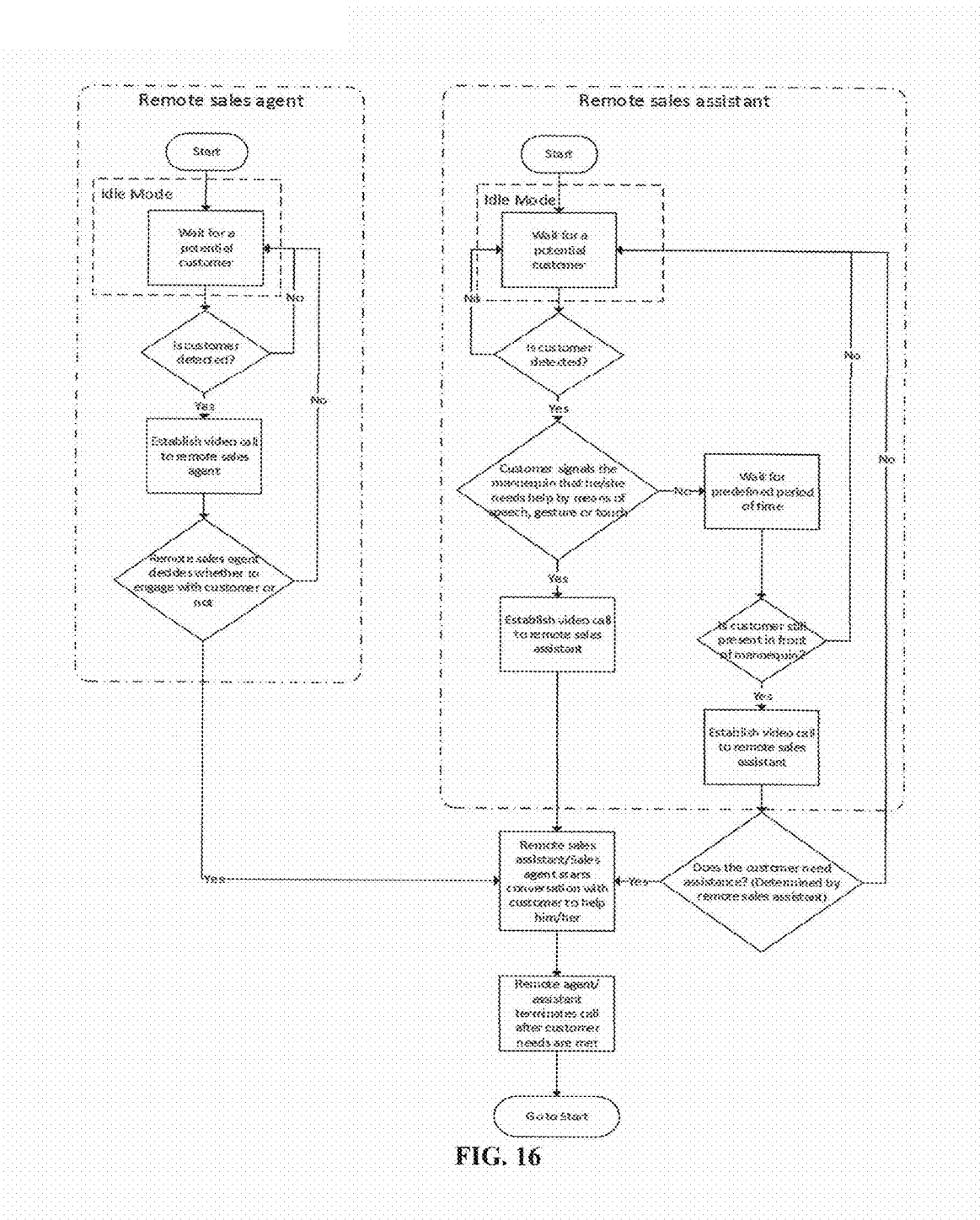
FIG. 16 provides illustrative logic flow diagrams in accordance with the disclosure.
Figure 17:
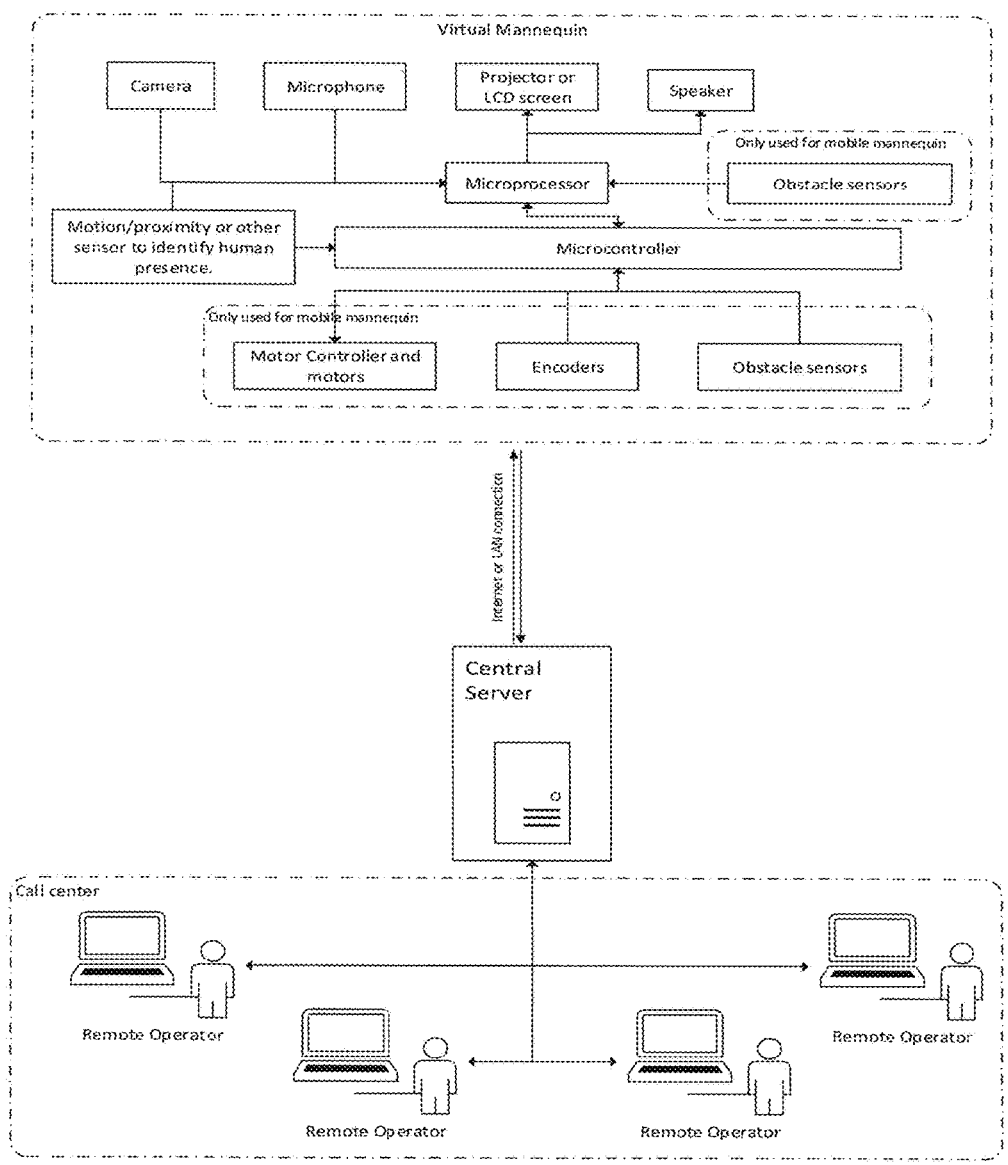
FIG. 17 is an exemplary systemization in accordance with the disclosure.

FIGS. 15-17 are illustrative data flow, logic flow and system diagrams describing examples of implementations of a display unit mannequin in accordance with the disclosure. FIG. 15 is a high level process flow and data flow diagram of an exemplary system in accordance with the disclosure. The process begins with a customer 100 coming into proximity with a display unit or virtual mannequin or display unit 110 as described herein. Proximity sensors (or visual observation of a remote sales agent or system operator) results in detection of the customer 100 at 102.

The system then automatically places a call 106 to a remote sales agent 120. The remote operator 120 or remote sales agent can then elect to engage the customer, and if so, provides response input 112 into a computer terminal that transmits the response input to the virtual mannequin or display terminal. The virtual mannequin or display terminal then generates an output 114 for display to the customer 100, which can be a direct video feed of the remote agent, or can more preferably be a virtual Digital Actor communicating with the customer as described above.

A logic flow diagram illustrating a way in which the system can operate is illustrated in FIG. 16. The first logic flow diagram is provided for operation of a remote sales agent. The system is activated and waits for a potential customer to come within range. Once a customer is detected, the system establishes a video call to a remote operator or sales agent. The remote operator or sales agent may be a dedicated resource assigned to the particular display unit. Alternatively, especially where a group of remote sales agents/operators is available, the call is automatically routed to an available remote sales agent/operator. Once the call is connected, the remote sales agent assigned to the call decides whether or not to engage the potential customer. If the remote sales agent decides to engage the customer, the agent turns their microphone off mute, and engages the customer. The remote agent can terminate the call after needs are met, or if needed, the remote agent can call in a local resource (local sales agent or manager) to complete the sale.

As further illustrated in FIG. 15, a remote sales assistant logic flow is provided. As with the remote sales agent, the system "sleeps" until a customer is detected. The customer then can communicate with the mannequin that they need help by verbal command, hand gesture or by touching a screen or interacting with another input device. Based on the customer input, the system establishes a video call to the remote sales assistant. The remote sales assistant then addresses the customer to help the customer. Once the customer is assisted, the call can end. Alternatively, the remote sales assistant can similarly call in a local resource to help the customer, if needed. In the absence of input from the customer, the system can wait for a predetermined period of time (e.g., 5, 10, 15, 20 seconds, etc.) and establish a video call if the customer does not leave the mannequin to assist the customer. If the customer has left, the system returns to sleep mode.

FIG. 17 illustrates an example of a system implementation. As illustrated, the virtual mannequin/display unit includes audio and video input and output devices to facilitate two-way audio-visual communication. Proximity sensors are provided, and all of the devices are operably coupled to a microprocessor and microcontroller. If the virtual mannequin is a mobile unit (e.g., wheeled robot), obstacle sensors and controllers and encoders can be provided to facilitate movement of the mannequin. A communication link can be established and/or maintained with a central server that completes communications links with a call center or other remote location including one or more remote operators that are trained and ready to help customers.

Real Voice TTS

A method of producing a TTS engine by using several audio recordings of a presenter reading a given suitable predefined set of sentences and words is proposed to use voice of a real person together with the Digital Actor. This helps to generate digital Actor of any famous person not only in his/her appearance, but also with his/her voice. The TTS generation can be done as an automated application which can identify different parameters of the voice of the presenter such as speech intonations, speech rate variation, pitch variations etc. For example, it can also capture phonemes from the audio recordings of presenter speech. These captured parameters can be used to generate a speech TTS engine which can be used together with real time Digital Actor.

Digital Display Solution

In the situation of a very large store covering a huge floor area with many aisles Display units provided in accordance with the disclosure can be placed conveniently in the aisles or in strategic locations within the shop floor. Thus, instead of walking all the way to the service desk or finding a service assistant, the customer only has to walk close to the display unit, or the customer can gesture by waving their hand to draw attention. Sensors in the display unit can then detect and immediately establish an audio or video call to a service assistant located remotely. If desired, the display unit can be mobile and can travel through the venue on a wheeled chassis, controlled by a remote operator, or being configured to automatically follow a pre-programmed path or based on an artificial intelligence system through the venue. The display solution can also be given to a website or a mobile phone app. Finally, the job/part of the job done by the operator can be automated by using an AI system such that there will not be a need for a remote operator. This helps to increase the number of digital displays given to a particular store by reducing the number of operators. The reason for this is the ability of using one operator for several displays such that only the problems that cannot be handled by the AI are handed by the human operator.

Figure 18:
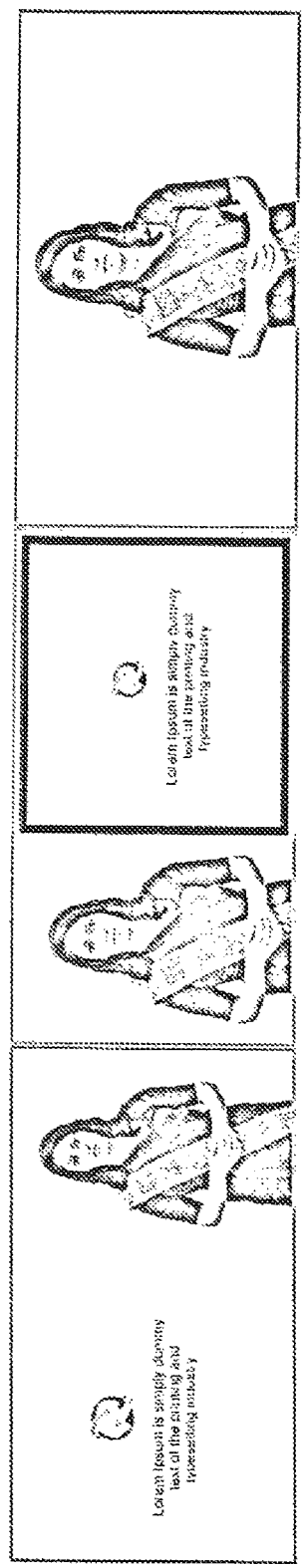
FIG. 18 is an illustration of different cases where the Digital Actor can be placed in the digital display screen at different places in different sizes.

In the digital display solution, the size of the virtual Digital Actor can be automatically adjusted depending on the resolution of the connected display device. The scaling is done to the Digital Actor by getting a factor using screen height to full image vertical resolution ratio. This factor is then used to resize all the components such as widths and heights of the head, eyes etc. Further using these techniques, the Digital Actor can be dynamically scaled, cropped and the position can be changed in real-time depending on the operator command or automatically depending on the space requirements in the digital display screen. The Digital Actor can be suddenly repositioned/switched to a new position of the screen. This helps to adjust the space utilization for the Digital Actor so that the required space for the advertisements, videos, and images used to promote the product can be done more effectively. Further the position and size of the Digital Actor can also be dynamically changed as an animation effect so that the changes will occur with the time in a given speed. Three such cases where the Digital Actor is positioned at different locations in the screen are illustrated in FIG. 18.

By using this space, the remote operator, via control commands, can selectively display one or more images, play videos, slide presentations or any other form of visual or audio visual presentation of products or/and services while simultaneously displaying images of the virtual Digital Actor with the capability to dynamically resize both the images of the Digital Actor and the audio visual presentation of products or/and services.

Figure 19:
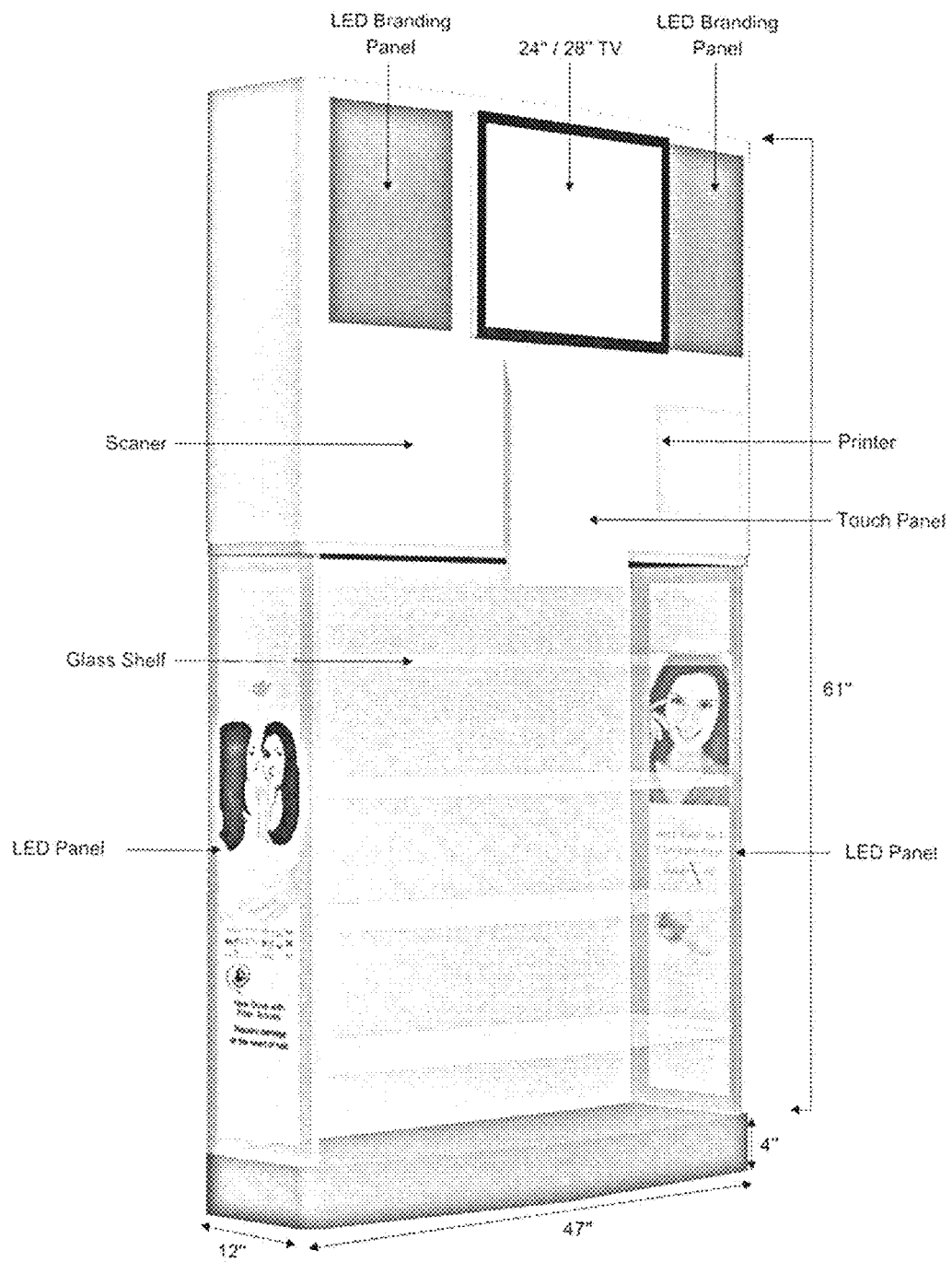
FIG. 19 is a pictorial representation of the complete system for digital display solution.

In a product selling environment at a store, the digital display solution is given as a box with all the required equipment that needs to complete the selling process of a product. As can be seen from FIG. 19, the system may consists of a digital display, barcode scanner, printer for printing the coupons, a touch pad to provide user input, speakers, hidden video cameras, microphones and other sensors and a rack to keep different products. The operator can effectively use the available equipment to sell the products. For example, when a customer comes in front of the display, the face and human recognition systems recognize the person and establish the connection and the virtual Digital Actor will appear on the display. After that the operator can carry out the relevant greetings required and ask about the needs of the customer. Depending on the requirements of the customer he can recommend different products that are available in the rack and explain their details including price by pushing different images/videos to the display. If the customer is ready to buy a product, the operator will then guide them to scan the product in the available barcode scanner in the setup. Then the relevant information with images and videos of the particular scanned product and the discounts that they provide will be automatically displayed on the digital display. Also a brief description of the product stored in a database will be given by the Digital Actor automatically. When the customer verifies to buy the product, a coupon will be automatically printed by the printer and the customer will be guided to give it to the cashier to do the payment. In this way the operator can attract the customers to do more and more selling of the products.

Thus, embodiments of the disclosure provide a productive and cost effective way to manifest a single or a group of sales assistants or sales agents from a single remote or from multiple remote locations. The display unit can be virtually present at different locations within one shop floor, and additionally can also be virtually present at geographically different shop locations, all at the same time. This enables a centrally located sales assistant/group of assistants to handle and assist remotely a number geographically spread stores in different time zones, especially during high volume periods. This can be very useful with chain stores that have standardized layouts. Virtual display units as described herein can permit centralized service of any chain store from a central location to help manage and assist customers in real time.

Mannequin Solution

Figure 2:
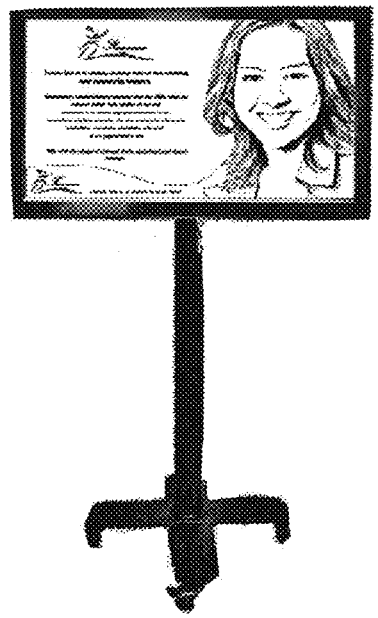
FIGS. 2-3 are views of a further electronic display unit in accordance with the disclosure.
Figure 3:
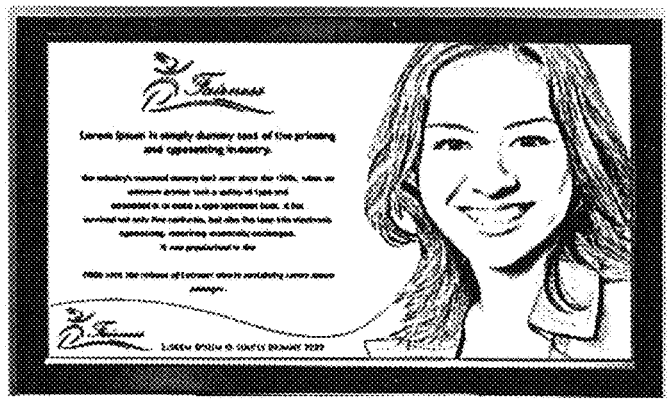

A mannequin (FIG. 1) that may include a display or an electronic monitor display stand on wheels or a projected display (FIGS. 2-3) can be part of the digital signage system, and be configured to enter an interactive mode for engaging the potential customer. When a prospective customer comes close to one of these displays within a preset perimeter, the system will detect the person and activate the display to "come alive". The detection of the customer within the range of the system automatically generates a video call to the remote location to a remote sales agent. The remote sales agent answers the call, and they will be able to see the customer on their monitor screen through a web cam installed inside the Mannequin or the display unit. The trained sales agent in the remote location can then observe the customer and ascertain whether the customer is a good prospect for purchasing the product. Once the sales agent decides to engage the customer, he or she will activate the system. In a different embodiment, the remote sales agent can monitor the surroundings of the display unit through the video camera or web cam and activate a conversation and engage potential customers as soon as they come near the display unit.

The display, which can have an images and videos of their products, can come alive with mimicked facial expressions, lip movements and hand gestures depending on the inputs of the remote trained sales agent as if the image of the promoter is talking directly to the customer. In some implementations, the remote operator can have two options to select from as described below.

(1) The facial expressions and body movements mimicked on the mannequin or the display face will be based purely on the remote sales agent's voice/text input.

(2) The facial expressions and body movements of the Digital Actor can be selected from a set of predefined emotions such as neutral face, happy face, calm face, greeting hands, pointing hand to something etc. to reflect a desired emotion.

In some available implementations, the facial expressions, including the emotions from the remote sales agent, are detected and mimicked in the mannequin/Digital Actor's face. Thus, embodiments of this disclosure provide a productive option and more freedom to the remote sales agent or operator, as this does not result in the remote sales agent having restricted movement or to be in front of a camera constantly. The remote sales agent can thus have the ability to move around and multitask with a wireless head set connection to permit the sales agent to be more productive.

In some implementations, if the promoter or national spokesperson of a product is a recognizable celebrity, the voice of the sales agent can be processed through voice changing and voice manipulating software in real time to make it sound similar to the celebrity's voice, regardless of the gender of the celebrity or the remote sales person. The customer is thus engaged in a conversation by the trained sales agent on a remote basis who can then promote the products on display in an effort to close the sale. In the event additional assistance is required to close the sale, the remote sales agent can discreetly (via SMS/Text, Instant Messaging, paging etc.) summon an in-store sales assistant or Manager to the location where the customer is communicating with the remote agent to complete the sale.

Projecting the Digital Actor Image to the Mannequin Screen

Figure 20:
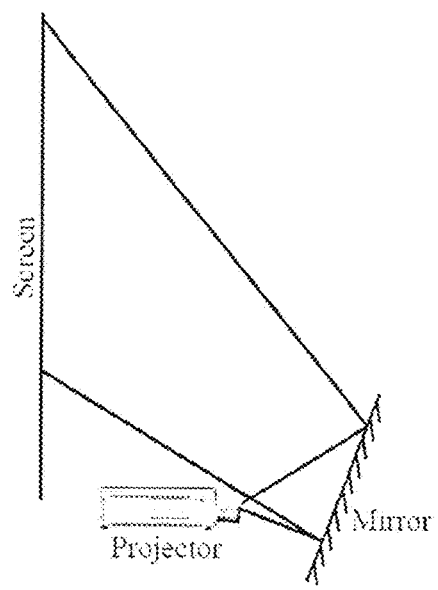
FIG. 20 is an illustration of the method used to reduce the projection distance of the projector by projecting at an angle with the use of a mirror.

The mannequin solution consists of a screen which has the shape of the Digital Actor such that the Digital Actor image can be displayed on it. For this purpose different techniques can be utilized. For example an LCD screen with the shape of the Digital Actor can be utilized for this purpose. This will be costly and cumbersome. The other approach is projecting the Digital Actor image onto a passive screen which is formed in the shape of the Digital Actor. The projection device can be mounted inside the mannequin. The method of placing the projector inside the mannequin device, will require a larger space inside the mannequin which will result in a bulky system. The reason for this is that the requirement of a sufficient distance for the projector to obtain large enough projected image. This problem is minimized using a proposed method that uses a mirror to minimize the projection distance from the projector to the screen. In this technique, the projected image is reflected using a tilted plane mirror and the reflected rays are projected to the screen as shown in FIG. 20.

Figures 21A, 21B:
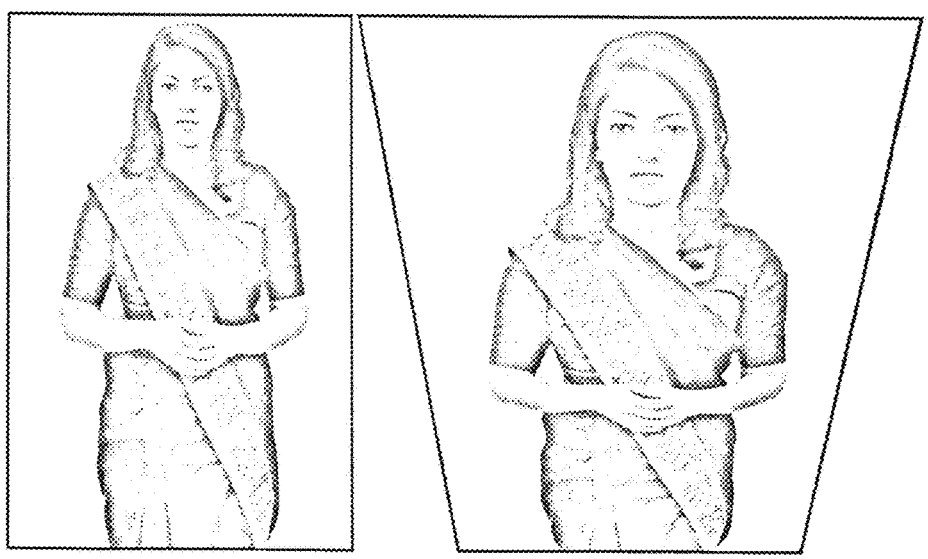
FIG. 21A is a pictorial representation of an original undistorted image used for projection.
FIG. 21B is the image of FIG. 21A distorted by projecting to the mannequin screen.

This technique reduces the space required to place the projector inside the mannequin to a minimum level. Since the projection is done at an angle (with the horizontal), the projected image onto the screen will have a distorted shape which cannot be directly used for the mannequin as shown in FIG. 21.

This problem is solved by using a distorted image depending on the projection angle so that the projected image on the screen will have the correct shape of the Digital Actor. The distorted image is created using a special mathematical camera model created using measured parameters of the projector such as projection angle of view, angle of projection etc. The method perspectively projects the Digital Actor image onto a tilted image plane to obtain a distorted image of the original Digital Actor image. A distorted image that is used for projecting in 60° angle is shown in FIG. 22. This distortion is done to all the separate parts of the body, face and eyes at the relevant distortion level required for each part separately. Further, as a next step, the backgrounds of the images are turned into black such that no light rays will be projected from those regions. This successfully projects the Digital Actor in the desired shape. The final background removed image for the upper body is shown in FIG. 23.

Figure 24:
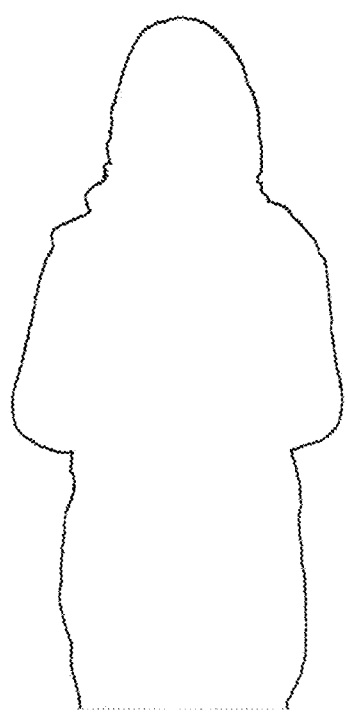
FIG. 24 is an illustration of the outline of the mannequin used to cut the shape of the screen.

The mannequin screen is cut according to the shape of the Digital Actor which can contain and fit to most of the outline shapes that can occur while the Digital Actor is speaking with all the body movements. This is done to make sure that the projected image of the Digital Actor does not go outside the region of the screen under any circumstance. Such an outline shape of the mannequin is shown in FIG. 24.

Web Solution

Online marketing is a vital part of any retail, affiliate, or network marketing business as there are many ways to benefit from the online world. Internet marketing knows no boundaries for the types of businesses that it can help to market. Therefore, a web solution of the Digital Actor technology that we propose can provide a large benefit to any sort of company.

The web solution integrates the interactive talking Digital Actor technology to the website. The online web solution has two ways of deployments. The Digital Actor is configured on the web page of the client. Other is where the web page of the client is accessed via an online server, where the server has the Digital Actor and is displayed on as a separate cover over the client's web page. With this technique the web page of the client is not impacted in any manner.

In the first approach, a small column or area given by the website owner is used for displaying the Digital Actor for interacting with the customer. Other is where the web page of the client is accessed via a separate online server, where the customers who access their website can be routed directly to the server where the Digital Actor and is displayed as a separate cover over the client's web page. In the latter case the website owner has the ability to selectively direct the incoming online traffic based on the geographic origin of the customer or level of the client (example Gold members) based on the cookie for personalized customer services using the Digital Actor.

The Digital Actor is controlled by one or more remote operators through an internet link to solve customer problems or promote the products in the website/shop. The method utilizes stored applications and files on a remote server for establishing the connection between the customer on the website and the operator. The application can be run at the server or the computer at the operator side so that large processing requirements can be achieved without use of a web application. The information is sent to the website by pushing images as a sequence with the voice of the Digital Actor or as a video/audio streaming. The talking Digital Actor software application can be run at the location of the operator or the server so that the images/video captured from the output can be directly sent with the audio.

Figure 4:
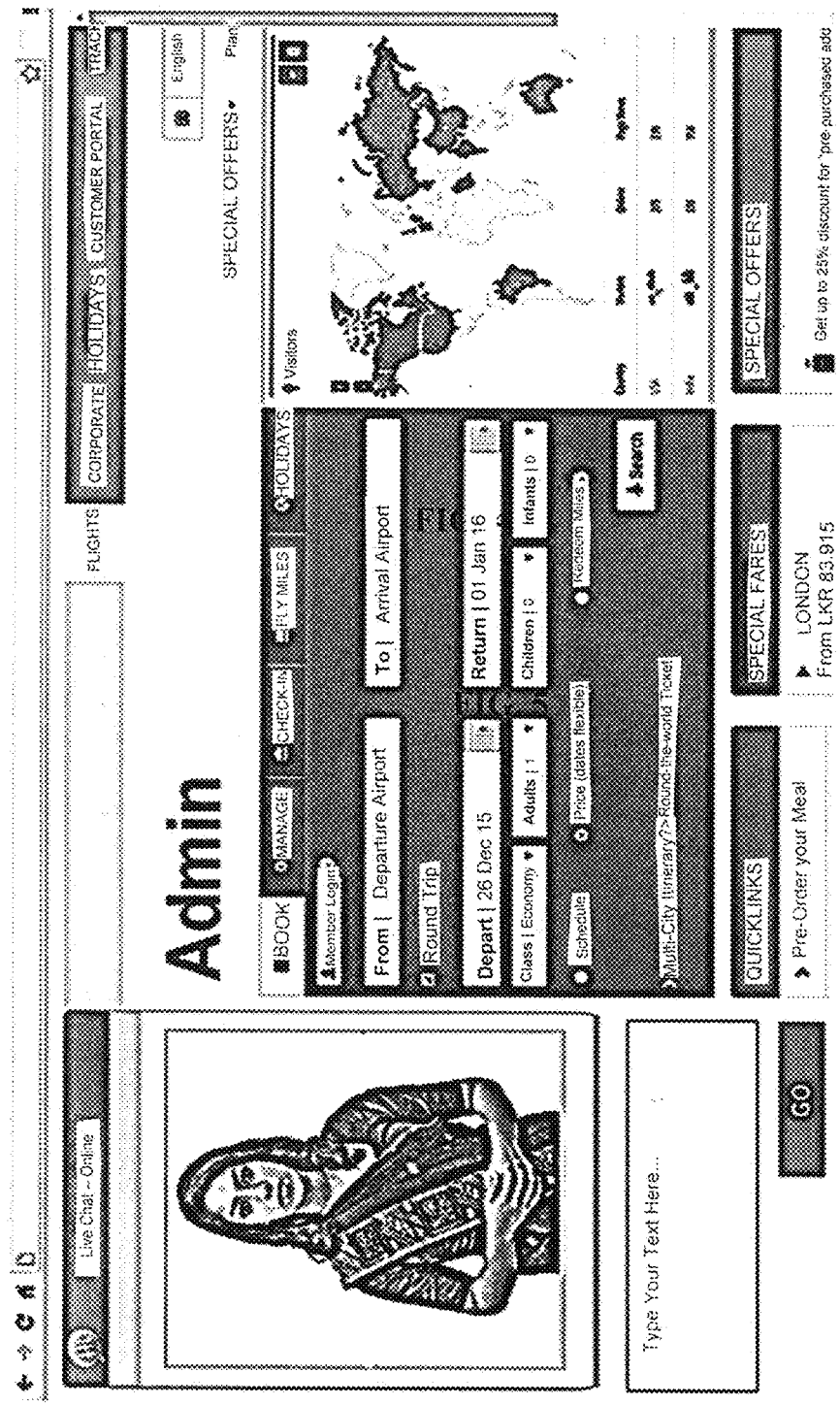
FIG. 4 is an illustration of virtual Digital Actor in the client website used in web solution.

Once the customer asks for the help of the Digital Actor from the website, a video call between the two is initiated. The service center may be located in an entirely different location. The Digital Actor then starts the operation by appearing on the website and can even perform an automatic greeting to the customer. A trained sales person in the remote location can then start speaking and engage directly with the customer. The trained sales person can be displayed in the website either in real appearance or a Digital Actor of a virtual sales person can be displayed instead. The lip synchronization and body movements of the Digital Actor will be done exactly as the digital display/mannequin solution. The sales person can see the face of the customers through the web camera and listen to their questions and promote the products of the company. Further the operator can have a set of frequently asked questions so that he can push them once such a question is raised. A simple demonstration of the web solution is illustrated in FIG. 4.

Smart Phone Solution

At a time when there are over 2 billion smartphone users worldwide and with as much as 50 percent of all searches occurring on a mobile device, large/small businesses that ignore mobile put future growth at risk. Individuals from occupations such as doctors, lawyers, engineers, IT professionals, miners, consultants, bankers etc. use smart phones. Smart phone is a ubiquitous device that is becoming more powerful with every passing day. Today, smart phone apps can perform a range of tasks previously limited to computers and laptops. Therefore, mobile is an opportunity to create better solutions for the customers and for the company. By acquiring an app, a business becomes prepared for the future. A business with an application stands a chance to benefit immensely from future technologies. A brand that does not have a mobile app appears outdated and isolated from modern day trends. However, mobile investments don't come cheap. Investing, developing and customizing a mobile app is an expensive and challenging process for a business company. A company and its customers might benefit from a mobile application in several different ways. A mobile app can target local customers and provide special offers, provide better customer support, collect feedback and data on customer behavior, staying competitive with other organizations, improve client awareness about the company services, improve brand visibility and expand customer base, provides ability to purchase products from a web store through the mobile app, provides easy accessibility, ability to display discounts through the app etc. Good customer support is crucial to keep getting new referrals, and a mobile app is an excellent channel for delivering support instantly and efficiently. It helps to learn more about their customers, from their locations, job roles, ages, spending limits, and much more.

Figure 5:
FIG. 5 is an illustration of using the virtual Digital Actor technology in smart phone application.

These aspects about smartphone applications show how effective a smartphone Digital Actor solution can be for a business company by providing an online application for android/ios mobile platforms. The Digital Actor solution can provide real-time engagement with customers through their mobile phones wherever they go. This kind of a technology is also applicable in tourist guide applications where the tourist can maintain continuous contact with the guide person at a remote location to have updates about routes and locations when travelling. A simple demonstration of the smartphone solution is depicted in FIG. 5.

Unlike the web solution, in the smart phone solution, the required image sequences (image databases) and other files are stored in the smartphone itself. The complete mobile app with all the necessary files can be given as downloadable content or any other form. As in the web solution, the trained sales person can be displayed on a screen of the display unit either in real appearance or a Digital Actor of a virtual sales person can be displayed instead. Once the customer asks for the help from the Digital Actor in the mobile application, a call between the two will be initiated even if the service center is located in an entirely different location. The communication between the two will be carried out via Internet. All the processing related to the talking Digital Actor movements/other content are done in a computer located at the operator location. The information related to visual presentation of the talking of the Digital Actor is sent as symbols from this computer to the mobile device app. The symbols will inform the mobile application what image is to be shown at what time. Since image databases required are stored in the mobile app, the only thing that the mobile app does is showing the relevant images in the mobile screen. Audio/video information from the mobile will be sent from the customer side to the operator using mobile microphone and the front camera. The voice or text will be sent from the operator to the mobile device app. In case of text input, the text is processed by the text to speech module in the operator side computer and only the converted voice is sent to the mobile device application. This technique helps to minimize the amount of data transferred between the customer and the operator which helps to maintain a good connectivity between the devices. The trained sales person can engage directly with the customer to promote their services or to help to solve their problems.

Digital Actor in Stereoscopic Displays and as a 3D Hologram

The Digital Actor solution can also be used to be viewed in 3D stereoscopic displays which are viewed either using goggles or without using goggles. Further, the Digital Actor solution can be used as a 3D hologram or a full volumetric image to depict a real person in front of the customers. The volumetric virtual Digital Actor can be viewed from any view point in the 3D space so that a more realistic conversation can be maintained with a customer or eve with a group of customers. The 3D Digital Actor maybe created either by reconstructing a 3D model using the discussed 2D Digital Actor and other images and video recordings taken from different viewpoints, or by creating complete fully animated 3D model using software. The 3D model maybe in the forms of, 1) a 3D polygonal mesh,
2) a 3D point cloud model,
3) a 3D volumetric image matrix.

Digital Actor as E-Learning Solution

Figure 6:
FIG. 6 shows the application of the Digital Actor solution as a presenter for a tutorial suit who can interview people or act as any other presenter such as a TV presenter that can provide different services to the customers.

The Digital Actor solution can also be used as an e-learning solution where the Digital Actor can perform tutorials in online sites, as recorded videos by replacing a real presenter which will cost more. The Digital Actor is also incorporated as a virtual interviewer (such as illustrated in FIG. 6) that can be placed in an online website or as standalone software that can provide who can interview students. The virtual Digital Actor can ask questions from the students and then display a set of answers from which the students can select the suitable answer/answers. The Digital Actor can give response to the given answer/answers and move on to the next question. The system can give marks to the students and evaluate their performance. The software is provided with the customizable capability to change the questions, number of questions, responses or comments to the answers, marking criteria etc. The online solution may be provided with the full customizable capability or as a fixed one which has a set of specific questions and responses to the answers. In the second method, it is possible to use a set of predefined videos depicting questions and responses and put them together using a simpler program to play the sequences properly to create the interview performance. This will limit the requirement of using a full web application which will require more computing performance. Further another method can be used by streaming the Digital Actor content as a real-time video so that the web software can made to be fully customizable and the application will run at a remote server and only the image and the sounds of the Digital Actor is streamed to the website.

Digital Actor as a Movie Suite

The virtual Digital Actor solution can also be used as a movie suite to replace real world actors, by performing lip sync according to speech, body and hand movements, gestures, facial expressions etc.

Digital Actor for TV, Online and Other Broadcasting Applications

Digital Actor solution can also be used as a presenter in TV, online or other type of broadcasting applications to replace real presenters to minimize cost and to provide errorless uniformity in service. The virtual Digital Actor presenter can be able to perform gestures, facial expressions and lip-sync in live or as a recorded program to the audience.

Digital Actor Standalone Desktop Application User-Interface

Digital Actor solution is incorporated in a full standalone application with a user-interface to control the Digital Actor performance. The use-interface has a textbox to put text input that needs to be spoken by the Digital Actor. At the places of the text where a gesture is necessary, user can right click and add a new gesture from a list of all the gestures. User can then adjust all the parameters related to the gesture such as speed, direction, gesture number, gesture type etc, and finalize the gesture. Similarly, the relevant facial expressions, pauses between speech segments and other commands can be added to the Digital Actor. The user can repeat the same process and correctly time all the performances of the Digital Actor. Finally, the user can convert the performance of the Digital Actor into a complete video with sound. Further, modifications such as changing backgrounds, change position and rotation of the Digital Actor can be done by the application. Also the application has the ability to change all the settings related to the Digital Actor such as, overall speed, amount of head movements, type of head movements, speaking rate, resolution of the Digital Actor, Digital Actor eye motion parameters etc.

Digital Actor Web User-Interface Application

Same application discussed above can be implemented as a web application, where the user can create the performance of the Digital Actor using the web user-interface and finally convert the Digital Actor performance into a video and download into their PC, Smart Phone etc. All the features of the standalone application can also be given to the web application. As an improvement to the performance of the Digital Actor application, the developed Digital Actor application is run at a server and only the urls of the images to be shown and the audio are sent to the web browser. Finally, the video can be created either in the web browser or at the server as necessary.

Digital Actor as a Virtual Presenter

In another aspect, the Digital Actor is used as a virtual presenter for a previously created PowerPoint presentation (Can use any kind of presentation software. In this method, a previously created presentation file is uploaded to the Digital Actor software and the Digital Actor will start to explain the details in the presentation step by step by putting slide by slide and explaining the content of each slide. The Digital Actor has full ability to use necessary gestures and fully utilize the space to do the presentation. The Digital Actor may be placed in a side or in a portion of the screen while other portion is used to display presentation slides. The application is also programmed to utilize side notes given to each slide while the delays, gestures and emotions can also be typed using the programming technique discussed earlier.

Incorporating an AI System to the Digital Actor

In another embodiment, Digital Actor system is integrated to any smart voice enabled, conversational or text based Artificial Intelligence (AI) platform that is either located on premises or remotely through the Internet. The AI system can be provided with questions from the users as text or as voice input and generate the answers as text or voice with relevant images, videos etc. The obtained answers are directly fed to the Digital Actor system to present it to the users in Digital Actor's voice. The Digital Actor system can process the obtained text or voice responses to produce the necessary mouth movements, lip sync and appropriate body movements. Hands and body movements are determined from the textual input or spoken words based on the library of phrases, indexed and matched to an appropriate gesture.

The AI based solution may principally utilize two types of AI platforms, namely Captive, and Open. The first type, Captive, is where AI is limited to an internal database in the premises or on the cloud. It has no access to any outside knowledge databases, such as ones available on the Internet. It seeks the answers from the internally stored database that was populated specifically for the subject matter.

The second type is a fully open AI platform which may search the web or other external sources and seek answers.

A third type of AI platform may also be utilized, and is a Hybrid AI platform, which will initially seek the answers internally from its own knowledge databases, and if no satisfactory answer is available internally it will liaise with external sources to seek the answer.

Figure 25:
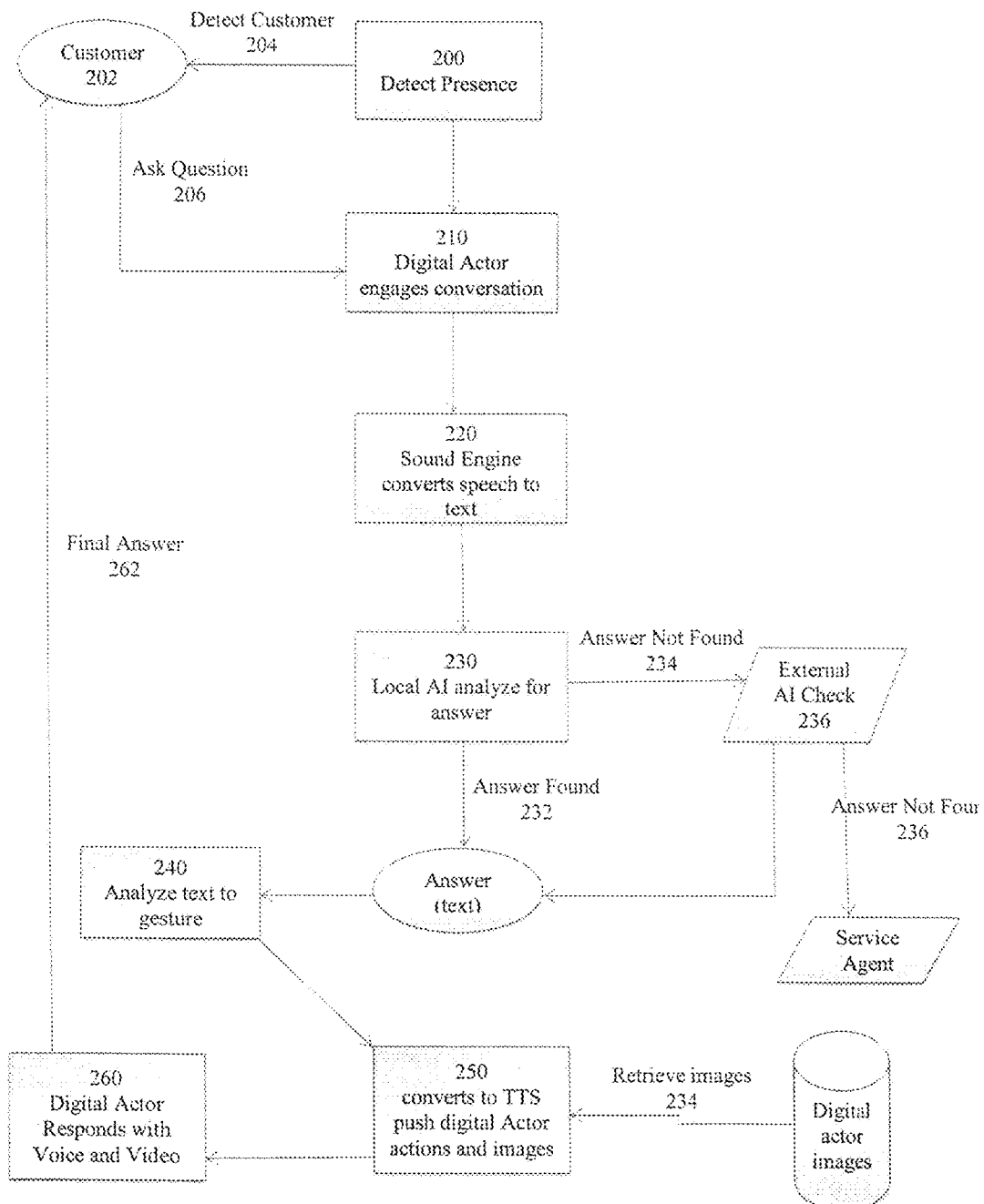
FIG. 25 is a basic block diagram that depicts the process of how the virtual Digital Actor engages and respond to a customer using Artificial Intelligence platforms.

The AI platform first converts the voice based question of the customer to text using a speech to text converter. Then an answer to the question is searched for, by seeking a closest match from an existing database of questions, to find the appropriate answer. For the Open AI platform and the Hybrid AI platform, the database is continually updated when new questions are raised, and for which an answer is found. If the AI platform could not find an answer from the database, it attempts to generate a new answer using existing knowledge contained within the system. If this also cannot answer the question, it will search online to get the answer. If the AI platform cannot find an answer online, the question will be referred to a service agent. A block diagram showing the process done by the AI system is depicted in FIG. 25

Further, the system will have the capability to process the answers obtained from the AI to generate the suitable gestures and reflect them in the Digital Actor. This is done by training a database consisting of information obtained by storing gesture information from large number of sentences with corresponding gestures. The algorithm will search for most suitable gesture for the given sentence. If the answer from AI also came along additional information such as relevant images, videos etc. The additional information can be presented on the screen as illustrated in FIG. 18. In the event the AI is unable to find the answers for the query, the system can transfer the call and engage the remote operator.

Although the present disclosure herein has been described with reference to particular preferred embodiments thereof, it is to be understood that these embodiments are merely illustrative of the principles and applications of the disclosure only and not as limiting the invention as construed in accordance with the accompanying claims. Therefore, modifications may be made to these embodiments and other arrangements may be devised without deviating from the spirit and scope of the disclosure.

What is claimed is:

1. A system for providing service to a customer by an artificial intelligence (AI) platform, the system comprising:
    a text input device configured to capture text input within a preset customer perimeter and transmit the captured text input to the AI platform;
    a microphone configured to capture sound input within the preset customer perimeter and transmit the captured sound input to the AI platform;
    a sensor configured to detect presence of the customer in the preset customer perimeter, and to trigger said system to initiate selective capture of, at least one of, the text input and the sound input therein, and said transmission from the preset customer perimeter and the AI platform;
    a means for displaying a virtual digital (VD) actor to the customer;
    a speaker configured to emit sounds within the preset customer perimeter, wherein the system is configured to interact with the customer by dynamically controlling a visual appearance of the VD actor displayed and sounds emitted from the speaker based on a response comprising at least one of sounds and text, received from the AI platform, to at least one of the text input and the sound input transmitted from the preset customer perimeter to the AI platform, and wherein the AI platform converts sound input to text using a speech-to-text converter; and
    a gesture database comprising at least one part sentence and a gesture associated with each of the at least one part sentence.

2. The system of claim 1 wherein at least part of the AI platform is located remotely and coupled to the said system via a network.

3. The system of claim 1 wherein the AI platform generates the response using one of a captive database comprising at least one of sounds and text stored in at least one of a local device and a cloud server, means of searching a plurality of internet websites, and a combination thereof.

4. The system of claim 3 further configured to connect through a network to a live remote service agent to obtain the response on occurrence of a predetermined event indicating failure of generating the response using the captive database and the means of searching the internet.

5. The system of claim 4 wherein the VD actor is replaced by a live stream of an audiovisual of the live remote service agent.

6. The system of claim 1 wherein the visual appearance of the VD actor is dynamically controlled using at least one gesture in said gesture database.

7. The system of claim 6 wherein the at least one gesture used is selected based on closeness in match between the response and the at least one part sentence.

8. The system of claim 1 wherein said system further comprises at least one equipment configured for performing a sale of an item, and wherein the at least one equipment is triggered into action based on capturing at least one of a predetermined text input and a predetermined sound input.

9. The system of claim 8 wherein the at least one equipment comprises at least one of a barcode scanner, a printer configured for printing at least one of a bill and a discount coupon.

10. The system of claim 1 wherein the system is configured to provide the response in a language one of a predetermined language, a language selected by the customer, a language of the sound input and a language of the text input.

11. A method for providing service to a customer by an artificial intelligence (AI) platform using a virtual digital (VD) actor displayed on a display means, the method comprising:
    capturing at least one of a text input and a sound input within a preset customer perimeter and transmitting the captured at least one of the text input and the sound input to the AI platform;
    sensing presence of the customer in the preset customer perimeter;
    triggering on sensing the presence, selective capture of at least one of, the text input and the sound input therein, and said transmission from the preset customer perimeter to the AI platform;
    interacting with the customer by dynamically controlling a visual appearance of the VD actor and sounds emitted from a speaker within the preset customer perimeter, based on a response comprising at least one of sounds and text, received from the AI platform, to at least one of the text input and the sound input, and wherein the AI platform converts sound input to text using a speech-to-text converter; and
    wherein the visual appearance of the VD actor is dynamically controlled using at least one gesture from a gesture database comprising at least one part sentence and a gesture associated with each of the at least one part sentence.

12. The method of claim 11 wherein the sound input, the text input, and the response is transmitted between the AI platform and the said system via a network.

13. The method of claim 11 wherein the AI platform generates the response using one of a captive database comprising at least one of sounds and text stored in one of a local device and cloud, means of searching a plurality of internet websites, and a combination thereof.

14. The method of claim 13 further comprising connecting through a network to a live remote service agent to obtain the response on occurrence of a predetermined event indicating failure of generating the response using the captive database and the means of searching the internet.

15. The method of claim 14 wherein the VD actor is replaced by a live stream of an audiovisual of the live remote service agent.

16. The method of claim 11 wherein the at least one gesture used is selected based on closeness in match between the response and the at least one part sentence.

17. The method of claim 11 wherein said method further comprises triggering into action at least one equipment configured for performing a sale of an item on capturing at least one of a predetermined text input and a predetermined sound input.

18. The method of claim 17 wherein said action comprises at least one of scanning a barcode, and for printing at least one of a bill and a discount coupon.

19. The method of claim 11 wherein the response is received from the AI platform is in a language from one of a predetermined language, a language selected by the customer, a language of the sound input and a language of the text input.

* * * * *